US010717547B2

(12) United States Patent
Stone

(10) Patent No.: US 10,717,547 B2
(45) Date of Patent: Jul. 21, 2020

(54) METHOD OF SUPPORTING A STRUCTURE USING AN INDEX PIN LOCKING APPARATUS

(71) Applicant: The Boeing Company, Chicago, IL (US)

(72) Inventor: Paul R. Stone, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 146 days.

(21) Appl. No.: 15/666,728

(22) Filed: Aug. 2, 2017

(65) Prior Publication Data

US 2017/0327248 A1  Nov. 16, 2017

Related U.S. Application Data

(62) Division of application No. 14/706,206, filed on May 7, 2015, now Pat. No. 9,751,641.

(51) Int. Cl.
*B64F 5/40*  (2017.01)
*B64F 5/10*  (2017.01)

(52) U.S. Cl.
CPC . *B64F 5/40* (2017.01); *B64F 5/10* (2017.01)

(58) Field of Classification Search
CPC ............................. B64F 5/40; B64F 5/10
See application file for complete search history.

(56) References Cited

U.S. PATENT DOCUMENTS 6,625,866 B2 * 9/2003 Stone ................. B21J 15/14
269/21
6,855,099 B2 * 2/2005 Hazlehurst ............ B21O 51/005
29/281.5

* cited by examiner

*Primary Examiner* — John C Hong
(74) *Attorney, Agent, or Firm* — Walters & Wasylyna LLC

(57) ABSTRACT

A method for supporting a structure includes coupling an index pin to the structure, moving an index head relative to the structure to receive the index pin within a bore extending through the index head, and actuating a pin lock of the index head to retain the index pin within the bore.

20 Claims, 18 Drawing Sheets

METHOD OF SUPPORTING A STRUCTURE USING AN INDEX PIN LOCKING APPARATUS

PRIORITY

This application is a divisional of U.S. Ser. No. 14/706,206 filed on May 7, 2015.

FIELD

The present disclosure is generally related to alignment fixtures for positioning and retaining structural components during a manufacturing operation and, more particularly, to apparatus and methods for indexing and retaining structural components, for example, spars of an aircraft wing during a robotic fabrication operation.

BACKGROUND

Assembly of structures utilizing robots is becoming increasingly common. During assembly of the structure, particularly during robotic assembly of relatively large structures (e.g., aircraft wings), one or more components of the structure are often held in position by a support system. Typically, support systems of this type include hardware, such as fixtures and pins that are aligned with and coupled to the component in order to retain the component at a desired location and/or position for processing of the component and/or assembly of additional components.

Disadvantageously, in order to process the structural component at or near a coupling location (e.g., an interface between the component and the hardware), the hardware must be released and moved away from the structural component. Following the processing operation, the hardware must then be moved back and reconnected to the component. Connecting the hardware to and releasing the hardware from the component often requires human interaction. For example, the support hardware must be manually connected to and released from the component in order to access areas of the component at or near one or more coupling locations.

Human interaction increases the cost and time of the manufacturing process. Human interaction also increases the risk of bodily injury. For example, any automated systems (e.g., robotic fixtures) must be deactivated before any manual operations may be performed.

Accordingly, those skilled in the art continue with research and development efforts in the field of indexing and retaining structural components during manufacture of a structure.

SUMMARY

In one embodiment, the disclosed index pin locking apparatus may include an index head including a bore extending through the index head, the bore being sized to receive an index pin, and a pin lock movable relative to the bore between a first position disengaged from the index pin and a second position engaged to the index pin.

In another embodiment, the disclosed retention apparatus, for supporting a structure in a predetermined position, may include a base, and an index pin locking apparatus including an index pin coupled to the structure, and an index head coupled to the base, the index head includes a bore extending through the index head, the bore being sized to receive the index pin, and a pin lock movable relative to the bore between a first position disengaged from the index pin and a second position engaged to the index pin.

In another embodiment, the disclosed method for supporting a structure in a predetermined position may include the steps of: (1) coupling an index pin to the structure, (2) automatically moving an index head toward the structure to receive the index pin within a bore of the index head, and (3) automatically actuating a pin lock of the index head to retain the index pin within the bore.

In yet another embodiment, the disclosed method for capturing an index pin within a bore of an index head may include the steps of: (1) positioning the index head relative to the index pin such that a bore axis of the bore intersects a pin axis of the index pin, (2) automatically moving the index head toward the index pin, (3) receiving a head of the index pin through a first opening of the bore, and (4) freely rotating the index head about at least one of an X-axis, a Y-axis and a Z-axis to self-align the bore axis and the pin axis as the head is received within the bore.

Other embodiments of the disclosed systems and method will become apparent from the following detailed description, the accompanying drawings and the appended claims.

DETAILED DESCRIPTION

Figure 1:
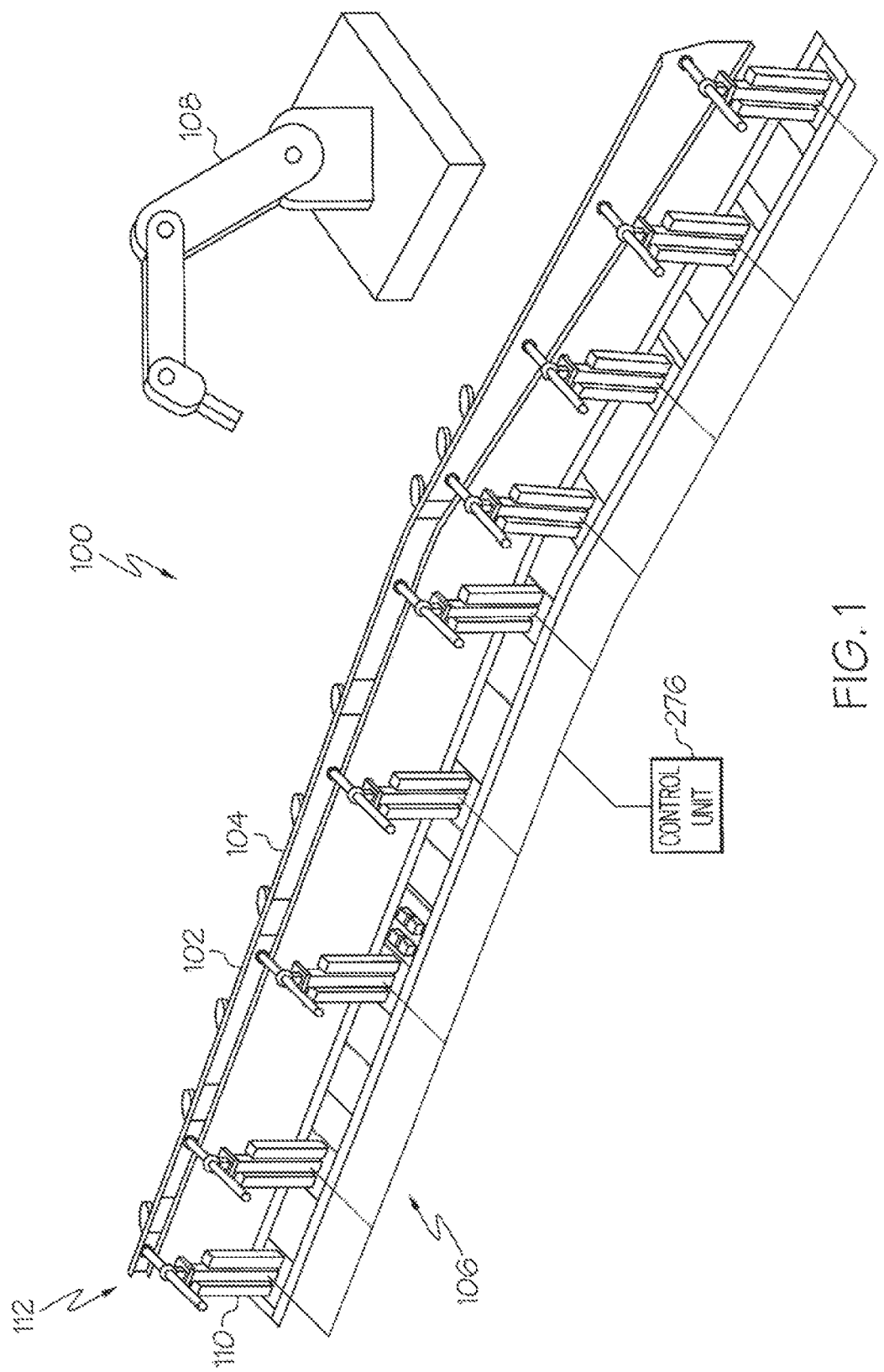
FIG. 1 is a schematic perspective view of one embodiment of a manufacturing environment.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 illustrates one embodiment of a manufacturing environment 100. The manufacturing environment 100 may be any suitable workspace where one or more manufacturing operations are performed on a structure 102. The structure 102 may include one or more components of a manufactured article. As one specific, non-limiting example, the structure 102 may be a spar 104 and the manufactured article may be a wing of an aircraft. The structure 102 may be any other component of any other manufactured article. The manufacturing operation may be any operation or process performed during fabrication, assembly or finishing of the manufactured article.

The structure 102 may be supported by a retention system 106. The retention system 106 may support the structure 102 at a predetermined (e.g., desired) location, position and/or orientation during one or more manufacturing operations. As one example, a robot 108 may be utilized to autonomously perform one or more manufacturing operations on the structure 102. The robot 108 may include a computer controlled robotic arm, autonomous vehicle or the like, for example, including one or more operation specific end effectors (not explicitly illustrated).

In one example, the retention system 106 may be movable, for example, between various stations of the manufacturing environment 100, such as to move the structure 102 to a location of a particular manufacturing operation. In another example, the retention system 106 may be fixed and the robot 108 may move to the structure 102 to perform a particular manufacturing operation. Mechanisms and techniques used for manual or autonomous movement of the retention system 106 and/or the robot 108 within the manufacturing environment 100 are known to those skilled in the art.

The retention system 106 (FIG. 1) may include one or more retention apparatus 110. Each retention apparatus 110 may engage the structure 102 at an index location 112 (e.g., an interface between the retention apparatus 110 and the structure 102). The retention apparatus 110 may support the structure 102 at a predetermined location, for example, within the manufacturing environment 100, and/or constrain the structure 102 at a predetermined position and/or orientation, for example relative to the robot 108, for performance of one or more manufacturing operations.

Figure 2:
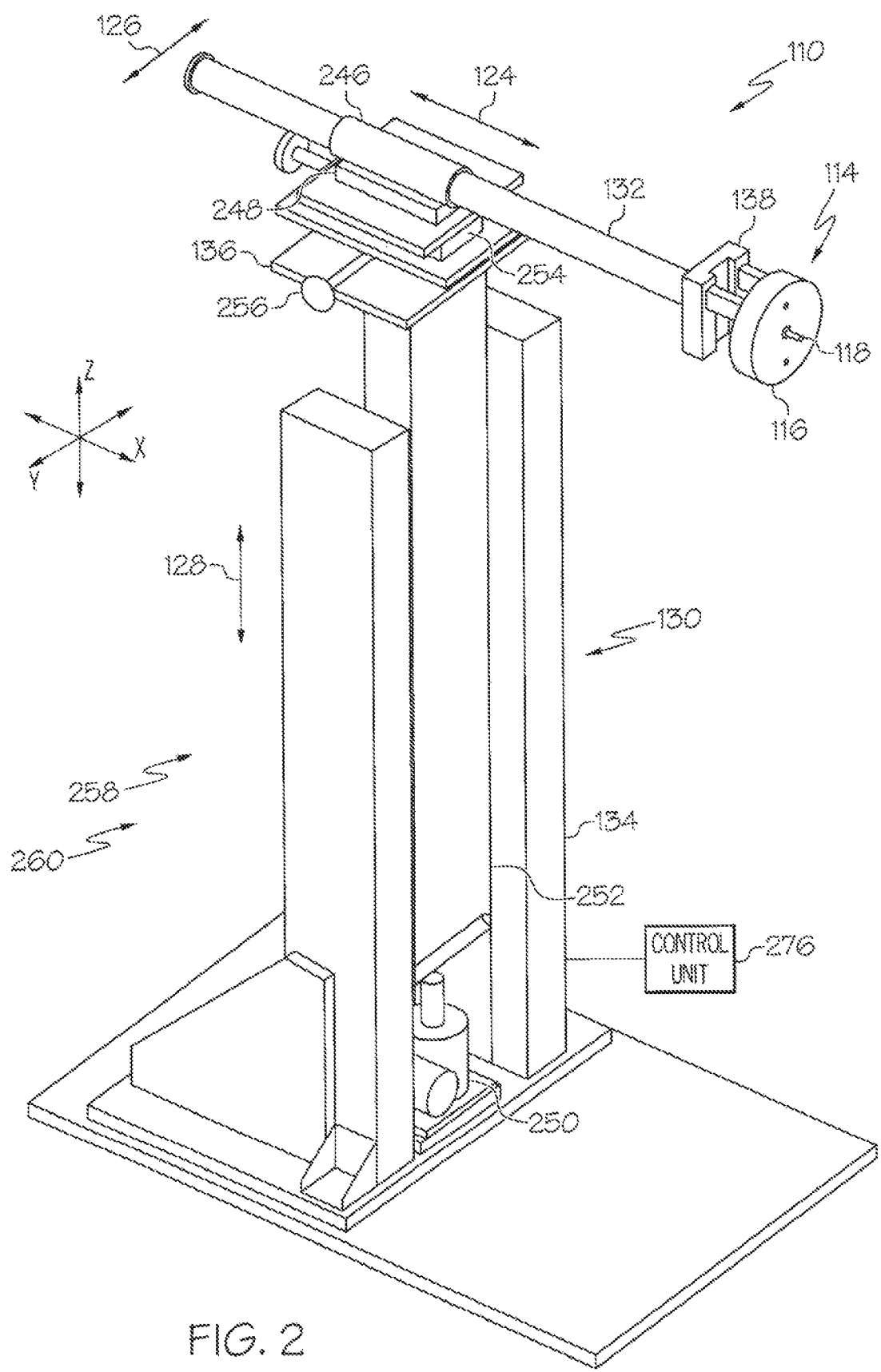
FIG. 2 is a schematic perspective view of one embodiment of a retaining apparatus.
Figure 4:
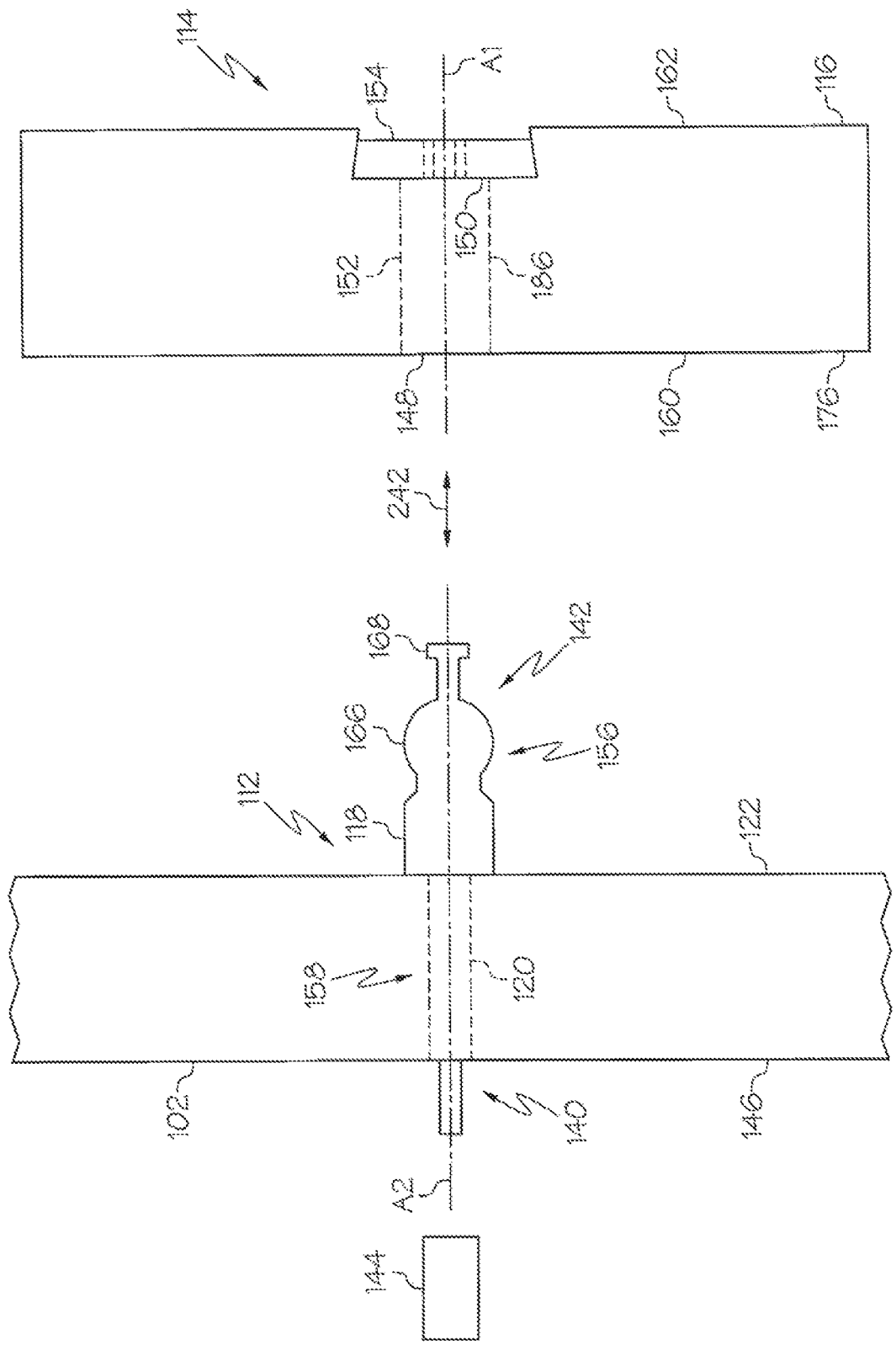
FIG. 4 is a schematic side elevational view of one implementation of one embodiment of an index pin locking apparatus being coupled to the structure.
Figure 5:
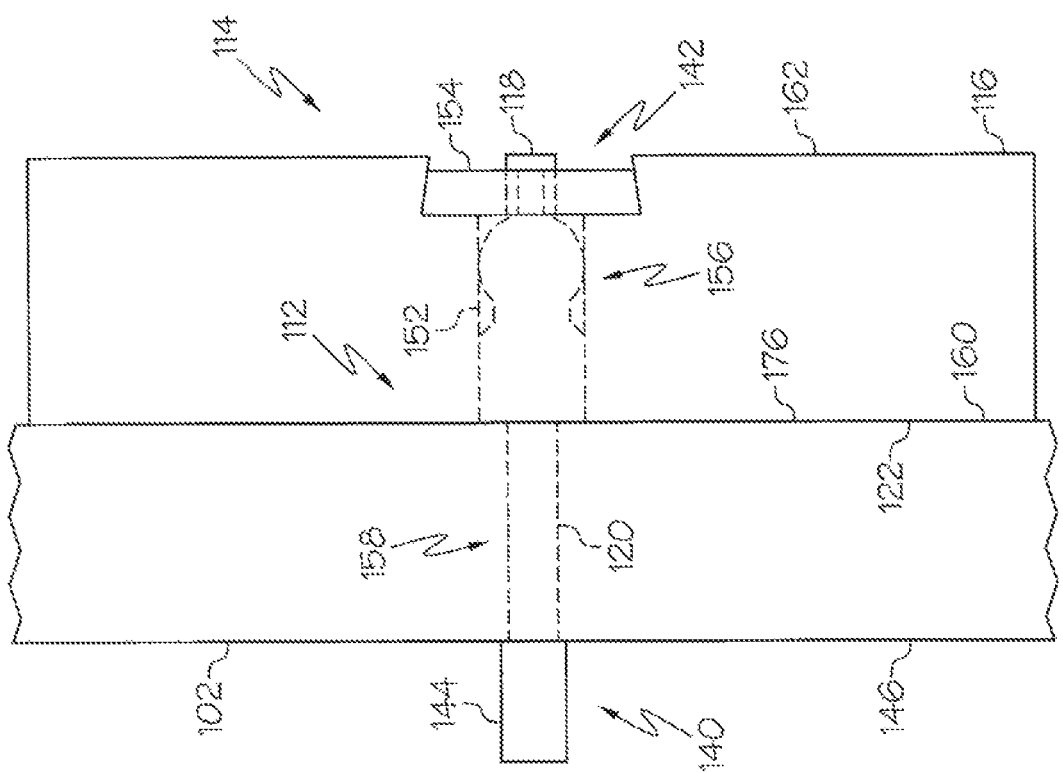
FIG. 5 is schematic side elevational view of the index pin locking apparatus coupled to the structure.

Referring to FIG. 2, and with reference to FIGS. 4 and 5, the retention apparatus 110 may include an index pin locking apparatus 114 and a base 130. The index pin locking apparatus 114 may be coupled to the base 130. The index pin locking apparatus 114 may be releasably coupled to the structure 102. The retention apparatus 110 may be configured to move the index pin locking apparatus 114 in space, for example, proximate (e.g., at or near) the index location 112 of the structure 102 to align the index pin locking apparatus 114 with an index opening 120 (FIGS. 4 and 5) disposed through the structure 102. As one example, the retention apparatus 110 may be configured to move the index pin locking apparatus 114 linearly along an X-axis (e.g., in the direction of arrow 124). As another example, the retention apparatus 110 may be configured to move the index pin locking apparatus 114 linearly along a Y-axis (e.g., in the direction of arrow 126). As another example, the retention apparatus 110 may be configured to move the index pin locking apparatus 114 linearly along a Z-axis (e.g., in the direction of arrow 128). As another example, the retention apparatus 110 may be configured to move the index pin locking apparatus 114 linearly along a combination of two or more of the X-axis, the Y-axis and/or Z-axis.

As one non-limiting example, the base 130 may include a support stanchion 134. The stanchion 134 may be configured to move the index pin locking apparatus 114 linearly along a Z-axis (e.g., in the direction of arrow 128). The stanchion 134 may include one or more linear guides (e.g., rails) 252 and one or more drive mechanisms 250.

The base 130 may include an index table 136. The index table 136 may be movably coupled to the stanchion 134. The index table 136 may be configured to move the index pin locking apparatus 114 linearly along the X-axis (e.g., in the direction of arrow 124), the Y-axis (e.g., in the direction of arrow 126) or a combination of the X-axis and the Y-axis. The index table 136 may include one or more linear guides (e.g., rails) 254 and one or more drive mechanism 256.

The base 130 may include an arm 132. The arm 132 may be movably coupled to the index table 136. The arm 132 may be configured to move the index pin locking apparatus 114 linearly along the X-axis (e.g., in the direction of arrow 124). The index pin locking apparatus 114 may be coupled to an end of the arm 132, for example, by a coupling 138. The arm 132 may move linearly relative to the index table 136 and/or the stanchion 134. Movement of the arm 132 may move the index pin locking apparatus 114 inward and outward relative to the structure 102, for example, in order to position the index pin locking apparatus 114 to engage the structure 102 or disengage from the structure 102. The arm 132 may include one or more linear guides and/or rails and a drive mechanism (not explicitly identified in FIG. 2).

As one example, the arm 132 may telescope through a sleeve 246 (e.g., a linear guide) coupled to a top of the index table 136. An actuator 248 (e.g., a drive mechanism) may move the arm 132 through the sleeve 246 to index to an extended position, for example, a position engaging the index pin locking apparatus 114 with the structure 102. As one general, non-limiting example, the actuator 248 may include an air cylinder (not explicitly illustrated). As another general, non-limiting example, the actuator 248 may include a servomotor and an encoder (not explicitly illustrated).

As a non-limiting example, one or more drive mechanisms 258 of the base 130, for example, the drive mechanisms 250 of the stanchion 134, the drive mechanisms 256 of the index table 136 and/or the actuator 248 of the arm 132, may be any suitable actuation device configured to drive linear motion, for example, along linear guides 260, for example, the linear guides 252 of the stanchion 134, the linear guides 254 of the index table 136 and/or the sleeve 246 of the arm 132. As non-limiting examples, the drive mechanisms may include mechanical devices, electro-mechanical devices, pneumatic devices, hydraulic devices and the like. As one example, the drive mechanisms 258 (e.g., the drive mechanisms 250, the drive mechanisms 256 and/or the actuator 248) may be automatically controlled.

As yet another example, the retention apparatus 110 may be configured to move the index pin locking apparatus 114 non-linearly (e.g., the index pin locking apparatus 114 may be freely movable in space). For example, the base 130 may include a robot arm (not illustrated) and the index pin locking apparatus 114 may be coupled to an end effector (not illustrated) of the robotic arm.

Figure 3:
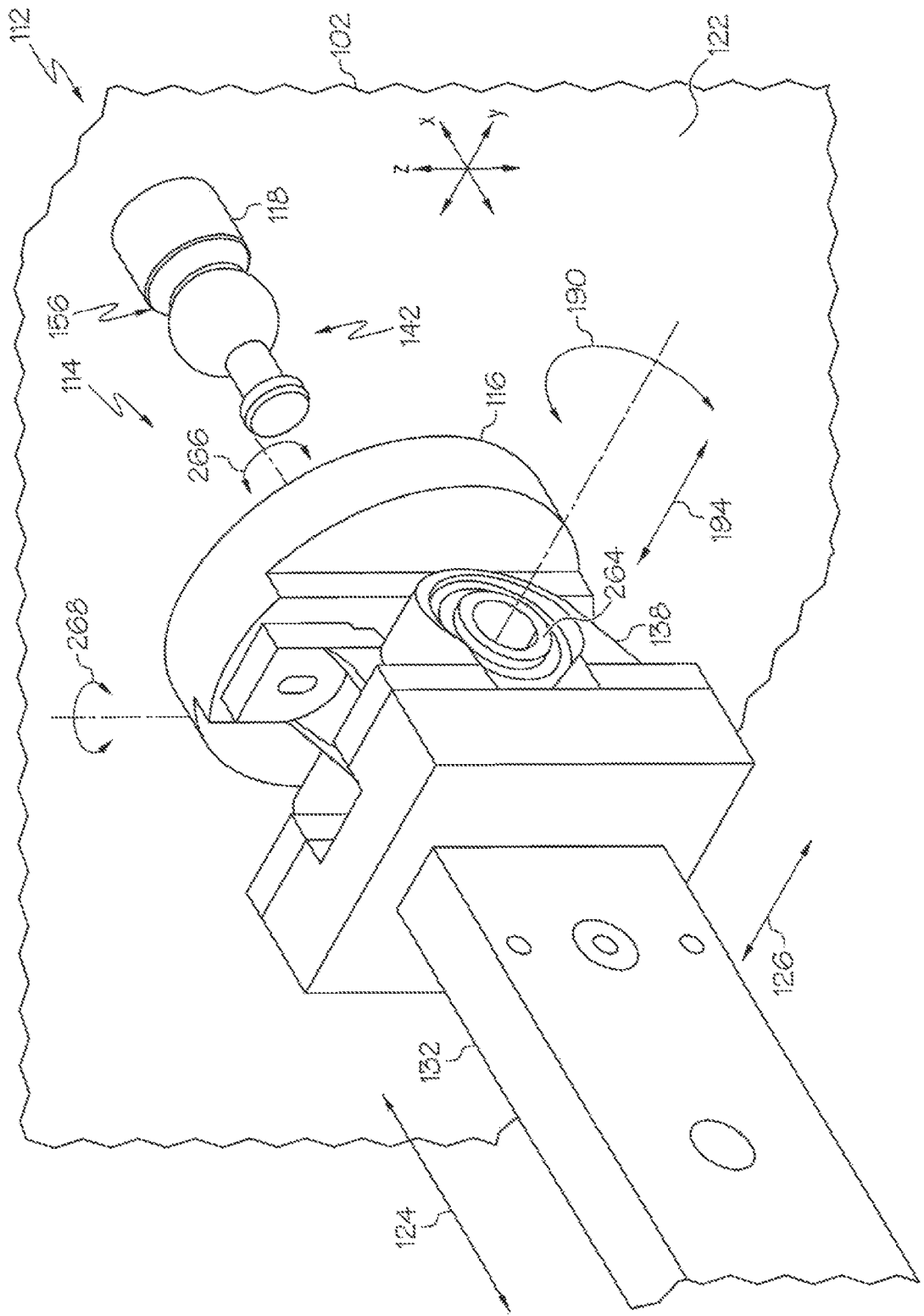
FIG. 3 is a schematic perspective illustration of one implementation of the retaining apparatus being coupled to a structure.

Referring to FIGS. 3-5, the index pin locking apparatus 114 may include index head 116 and index pin 118. The index pin 118 may be coupled to the structure 102, for example, at the index location 112. As one example, the index pin 118 may be coupled to (e.g., inserted through) the index opening 120 (FIGS. 4 and 5) in the structure 102. A location of the index opening 120 (e.g., a through hole) in the structure 102 may define the index location 112. The index pin 118 may be securely coupled to the structure 102. As one example, the index pin 118 may be mechanically fastened to the structure 102. For example, a fastener 144 may be mechanically coupled to the first end 140 of the index pin 118, as illustrated in FIGS. 4 and 5.

Referring to FIGS. 4 and 5, as one example, and as illustrated in FIG. 4, the structure 102 may include a second surface 146 opposite the first surface 122. The index pin 118 may include a suitable size (e.g., length) such that the first end 140 extends past the second surface 146 of the structure 102. When coupled to the structure 102 (e.g., when received through the index opening 120), at least a portion of the index pin 118 (e.g., a portion of the index pin 118 proximate a first end 140 thereof) may extend past (e.g., substantially perpendicularly outward from) the second surface 146. The fastener 144 may be mechanically coupled to the portion of the index pin 118 extending past the second surface 146 of the structure 102. As one example, the portion of the index pin 118 extending past the second surface 146 of the structure 102 (e.g., proximate the first end 140) may include external thread and the fastener 144 may be threadably connected to the first end 140 of the index pin 118 and in contact with the second surface 146 of the structure 102. For example, the fastener 144 may be a nut.

As used herein, the term "substantially" generally refers to being within an acceptable manufacturing tolerance. Those skilled in the art of structure assembly and manufacture will readily appreciate acceptable manufacturing tolerances.

As another example (not explicitly illustrated), the index pin 118 may include a suitable size (e.g., length) such that the first end 140 terminates at the second surface 146 of the structure 102. The fastener 144 may be mechanically coupled to the index pin 118 at the first end 140. As one example, the first end 140 of the index pin 118 may include in internally threaded bore and the fastener 144 may be threadably connected to the first end 140 of the index pin 118 within the bore and in contact with the second surface 146 of the structure 102. In such an example, a portion of the fastener 144 (e.g., a head (not explicitly illustrated) of the fastener 144) may in contact with the second surface 146 of the structure 102. For example, the fastener 144 may be a shoulder bolt.

Referring to FIGS. 3-5, when coupled to the structure 102 (e.g., when received through the index opening 120), at least a portion of the index pin 118 (e.g., a portion of the index pin 118 proximate a second end 142 thereof) may extend past (e.g., substantially perpendicularly outward from) the first surface 122 of the structure 102. The index head 116 may be configured to engage the structure 102 and to be releasably coupled to the index pin 118.

Referring to FIGS. 4 and 5, the index head 116 may be configured to come into surface contact with the first surface 122 of the structure 102 and to receive the index pin 118. As illustrated in FIG. 4, the index head 116 may include a bore 152. The bore 152 may define a passage completely through the index head 116 and include a central bore axis A1 (FIG. 4). The internal diameter of the bore 152 may be suitably sized to receive the head 156 of the index pin 118.

The index head 116 may include a first opening 148 and a second opening 150 opposite the first opening 148. The bore 152 may extend from the first opening 148 to the second opening 150. The internal diameter of the first opening 148 may be suitably sized for insertion of the head 156 of the index pin 118. In one example construction, an internal diameter of the second opening 150 may be equal to the internal diameter of the first opening 148. In another example construction, the internal diameter of the second opening 150 may be less than the internal diameter of the first opening 148 to prevent the head 156 of the completely exiting the bore 152 through the second opening 150, for example, when the index pin 118 is uncoupled from the structure 102 and received through the bore 152 of the index head 116. When the index pin 118 is coupled to the structure 102, contact between the first sidewall 160 of the index head 116 and the first surface 122 of the structure 102 may prevent the head 156 of the completely exiting the bore 152 through the second opening 150.

The index pin 118 may include a central pin axis A2 (FIG. 4). During coupling of the index head 116 to the index pin 118, the index pin 118 (e.g., the portion of the index pin 118 proximate the second end 142 and extending from the first surface 122 of the structure 102) may be received through the first opening 148, extend coaxially through the bore 152 and partially extend through the second opening 150.

The index head 116 may include a pin lock 154. The pin lock 154 may be configured to releasably engage the index pin 118 once received by the index head 116. At least a portion of the index pin 118 proximate the second end 142 thereof may extend from (e.g., substantially perpendicularly outward from) the second opening 150 of the bore 152. The pin lock 154 may engage the portion of the index pin 118 (e.g., proximate the second end 142) extending past the second opening 150 to lock the index pin 118 to the index head 116 within the bore 152.

Figure 6:
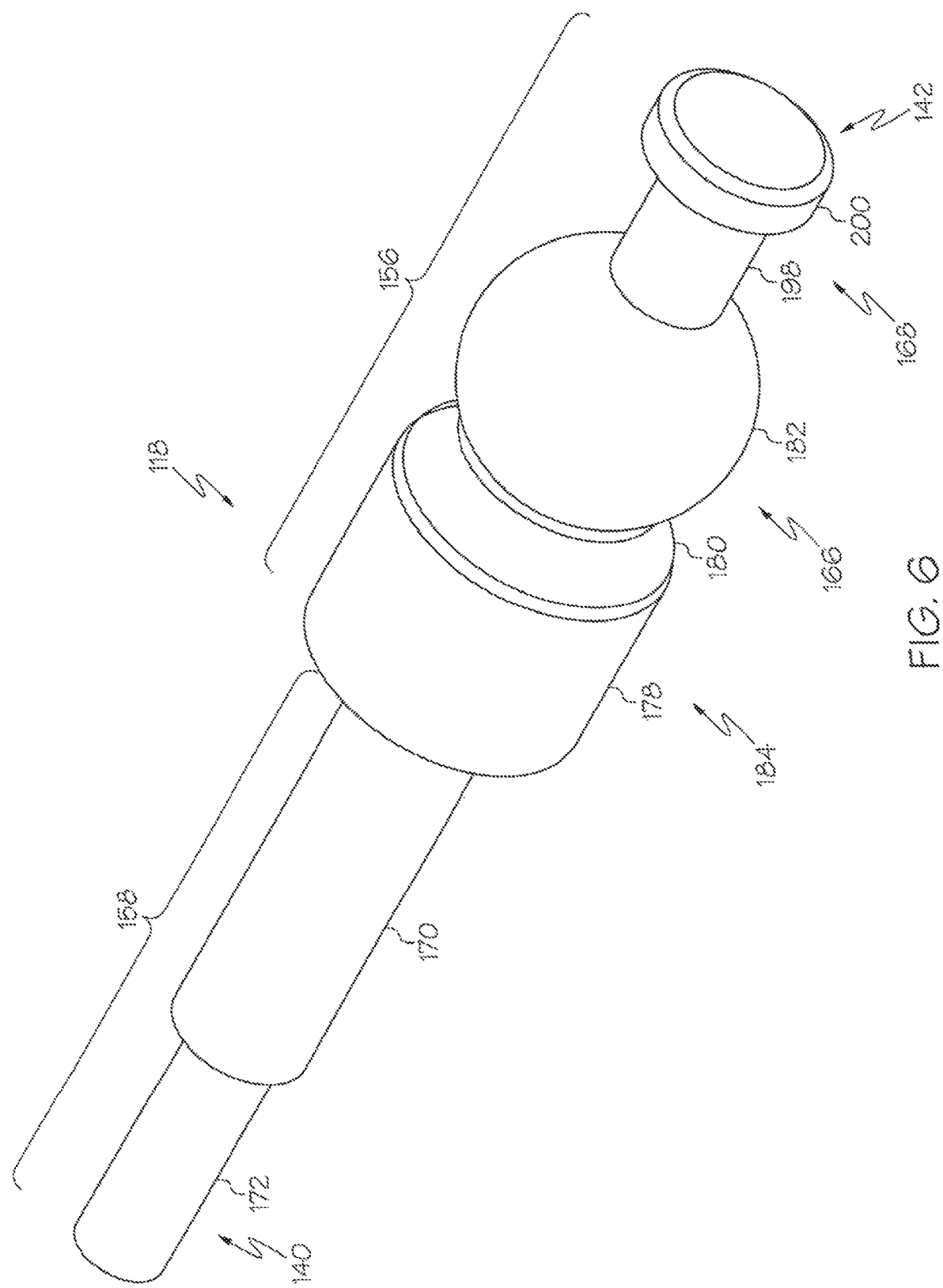
FIG. 6 is a schematic perspective view of one embodiment of an index pin of the index pin locking apparatus.
Figure 7:
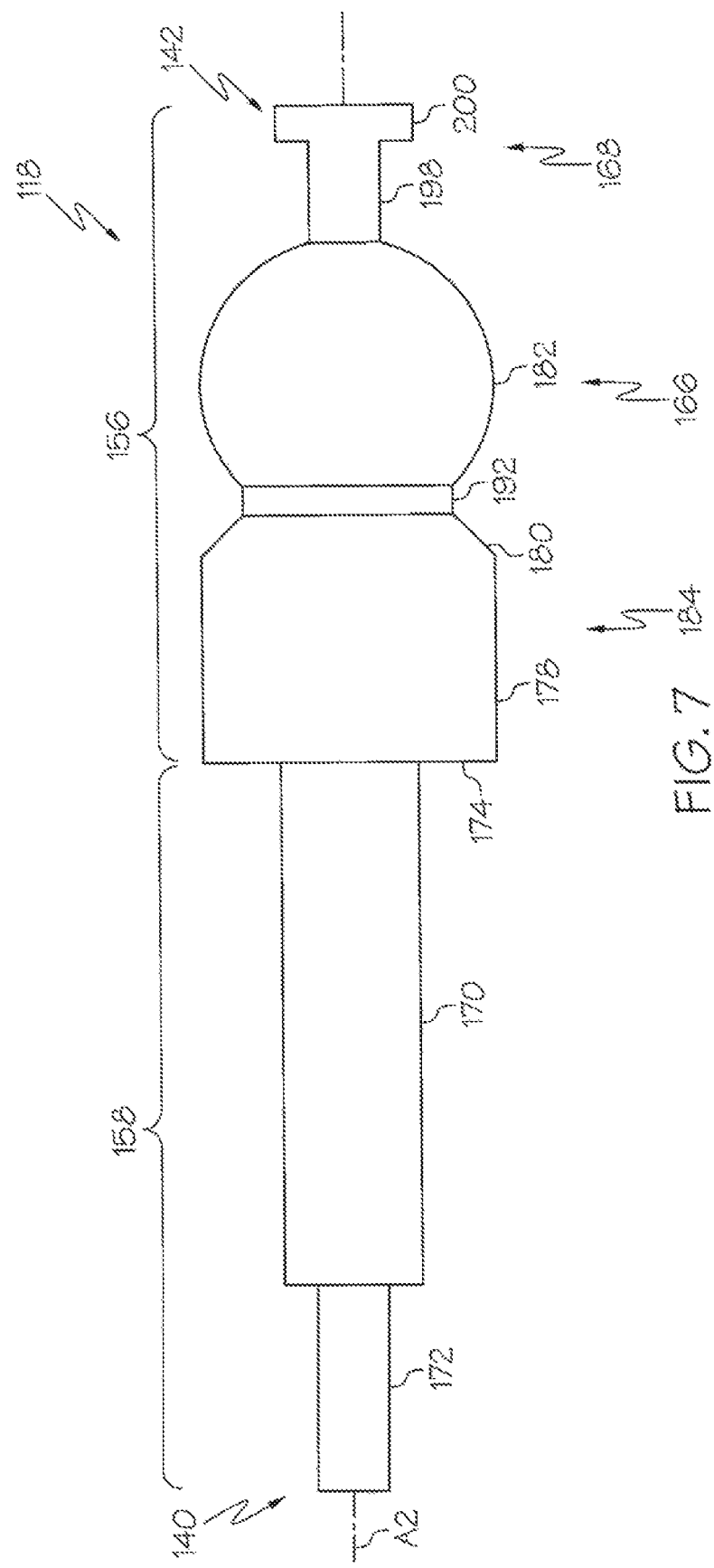
FIG. 7 is a schematic side elevational view of the index pin of FIG. 6.

Referring to FIGS. 6 and 7, and with reference to FIGS. 4 and 5, the index pin 118 may include a head 156 and a shank 158. The head 156 of the index pin 118 may include a neck 184, a lead-in 166 and an interlock 168. The shank 158 may be coupled to (e.g., extend from) the head 156 (e.g., from the neck 184) along the pin axis A2 (FIG. 7). The shank 158 may be received through the index opening 120 in the structure 102. The shank 158 may include an external diameter in close tolerance with (e.g., slightly smaller than) an internal diameter of the index opening 120. As one example, the shank 158 and the index opening 120 may form a clearance fit. As illustrated in FIG. 4, upon the index pin 118 being coupled to the structure 102 (e.g., upon the shank 158 being completely inserted through the index opening 120), the head 156 may engage the structure 102.

At least a portion of the head 156 of the index pin 118 (e.g., the neck 184) may include an external diameter larger than the external diameter of the shank 158 and, thus, larger than the internal diameter of the index opening 120. The head 156 may include a shoulder 174. The shoulder 174 may be defined by the difference in the external diameters of the head 156 (e.g., the neck 184) and the shank 158. As illustrated in FIG. 4, upon the index pin 118 (e.g., the shank 158) being completely inserted through the index opening 120, the shoulder 174 of the head 156 may engage (e.g., come into surface contact with) the first surface 122 of the structure 102.

The shank 158 may include a shaft portion 170 and a connector portion 172. The shaft portion 170 may include a substantially straight and cylindrical body configured to fit within (e.g., be inserted through) the index opening 120 in the structure 102. As illustrated in FIG. 5, upon the index pin 118 (e.g., the shank 158) being completely inserted through the index opening 120, the index pin 118 may be fastened, for example, by the fastener 144, to the structure 102. The shaft portion 170 may include an external diameter in close tolerance with (e.g., slightly smaller than) the internal diameter of the index opening 120. The shaft portion 170 may include a length substantially equal to a thickness of the structure 102, or a length of the index opening 120, such that an end of the shaft portion 170 opposite the head 156 is proximate (e.g., at or near) the second surface 146 of the structure 102 upon the shank 158 being completely inserted through the index opening 120.

The connector portion 172 may be disposed at the end of the shaft portion 170 opposite the head 156. In one example, and as illustrated in FIGS. 4, 6 and 7, the connector portion 172 may be coupled to (e.g., extend from) the shaft portion 170 along the pin axis A2. The fastener 144 (FIG. 4) may be mechanically coupled to the connector portion 172. For example, the connector portion 172 may include external thread and the fastener 144 (e.g., a nut) may be threadably connected to the connector portion 172. As another example (not explicitly illustrated), the connector portion 172 may be disposed within the shaft portion 170 at the end opposite the head 156. For example, the connector portion 172 may include an internally threaded bore extending within the shaft portion 170 and the fastener 144 (e.g., a shoulder bolt) may be threadably connected to connector portion 172 (e.g., within the shaft portion 170). In either example, the fastener 144 may include an external diameter larger than the internal diameter of the index opening 120 (FIGS. 4 and 5). The structure 102 may be secured (e.g., clamped) together between the head 156 (e.g., the shoulder 174) of the index pin 118 and the fastener 144.

Other configurations of the index pin 118 are also contemplated. Other techniques of coupling the index pin 118 to the structure 102 are also contemplated.

Referring to FIGS. 3-5, and with reference to FIGS. 6 and 7, upon the index pin 118 being coupled to the structure 102 (e.g., the shank 158 being completely inserted through the index opening 120 and fastened), the head 156 may be received by the index head 116 (e.g., within the bore 152) to couple the index head 116 to the structure 102. As illustrated in FIG. 3, the index head 116 may be positioned proximate to and aligned with the index pin 118. For example, the index head 116 may be moved into position by the base 130 (e.g., the stanchion 134, the index table 136 and/or the arm 132) of the retention apparatus 110 (FIG. 2).

As illustrated in FIG. 4, once the index head 116 is positioned proximate to and/or aligned with the head 156 of the index pin 118, the index head 116 may be moved (e.g., linearly in the direction of arrow 242) to receive the head 156 of the index pin 118 through the first opening 148 of the index head 116. For example, the index head 116 may be moved by the arm 132 of the base 130 (FIG. 3) in the direction of arrow 242 to slide the head 156 into the bore 152. The index head 116 may be further moved (e.g., linearly in the direction of arrow 242) to completely insert the head 156 of the index pin 118 (e.g., until the neck 184, the lead-in 166 and the interlock 168 are completely received) within the bore 152, as illustrated in FIG. 5. The neck 184 and the lead-in 166 of the head 156 of the index pin 118 may be positioned coaxially within the bore 152 of the index head 116. The interlock 168 may extend through the second opening 150 of the index head 116. With the interlock 168 extending through the second opening 150 of the index head 116, the pin lock 154 may operatively engage the interlock 168 to couple the index head 116 to the index pin 118 (e.g., to retain the index pin 118 within the bore 152).

Figure 8:
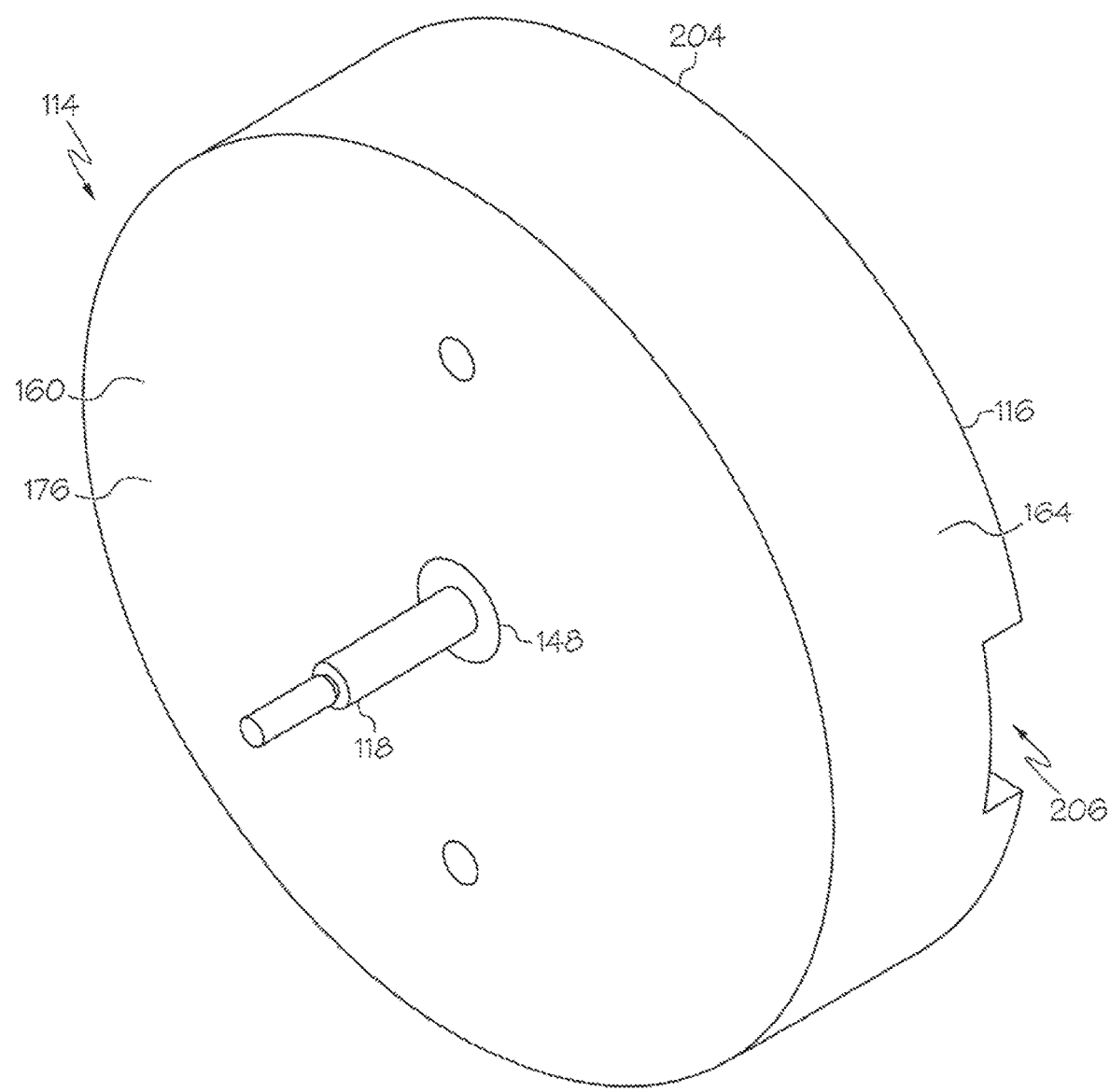
FIG. 8 is a schematic perspective view of one embodiment of the index pin locking apparatus.
Figure 9:
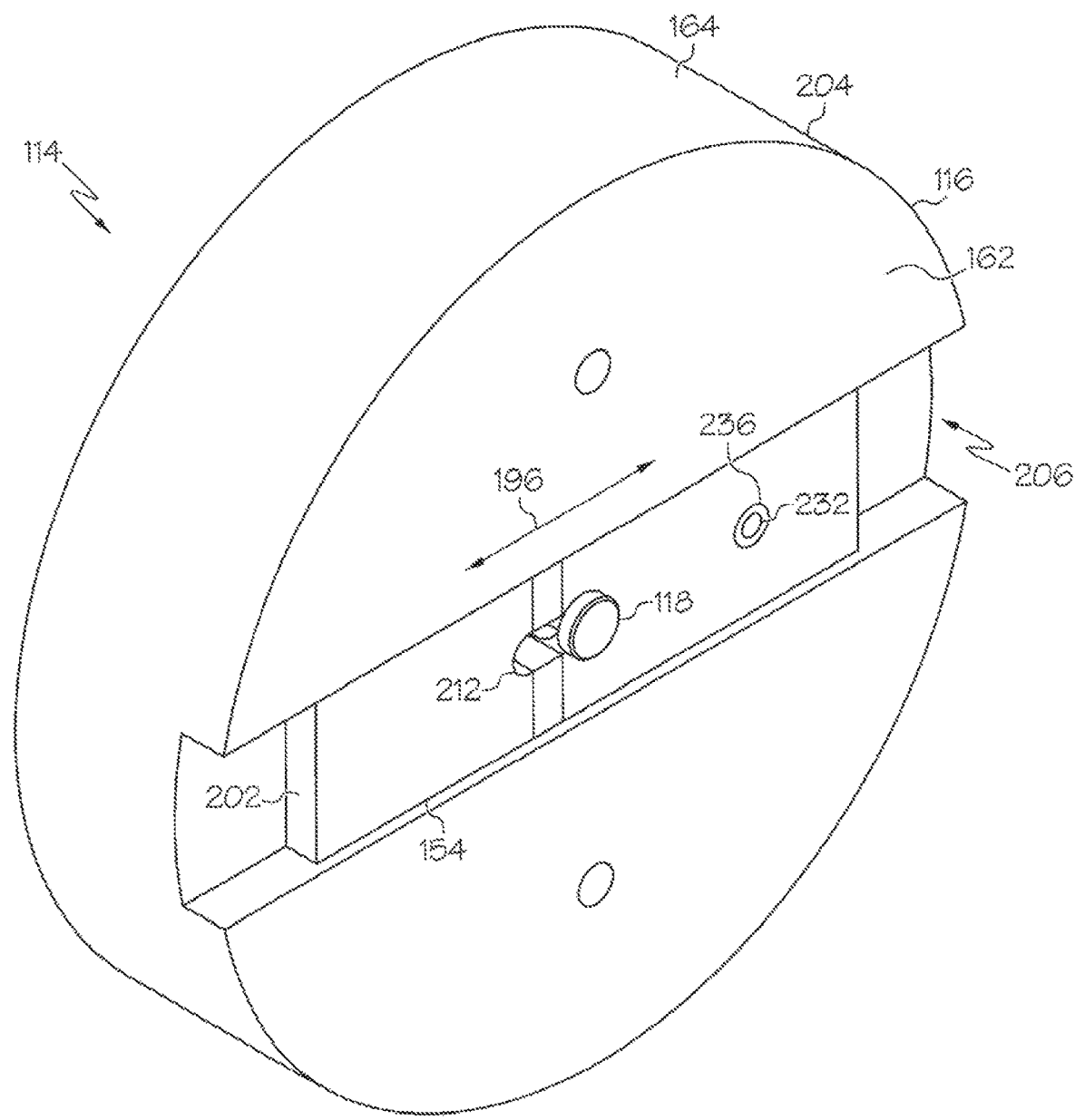
FIG. 9 is a schematic perspective view of the index pin locking apparatus of FIG. 8 illustrating a pin lock in a first position.
Figure 10:
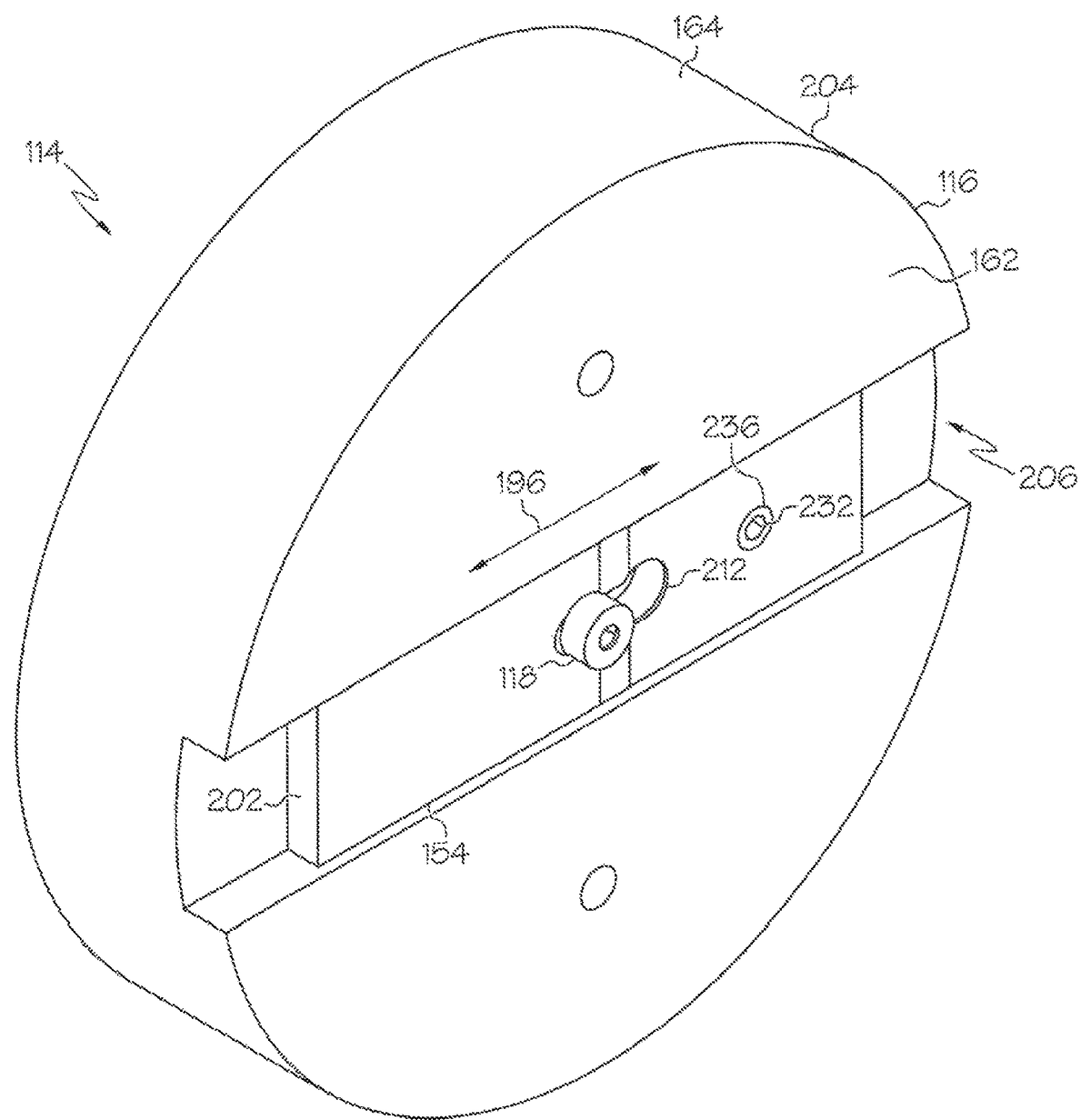
FIG. 10 is a schematic perspective view of the index pin locking apparatus of FIG. 8 illustrating a pin lock in a second position.
Figure 11:
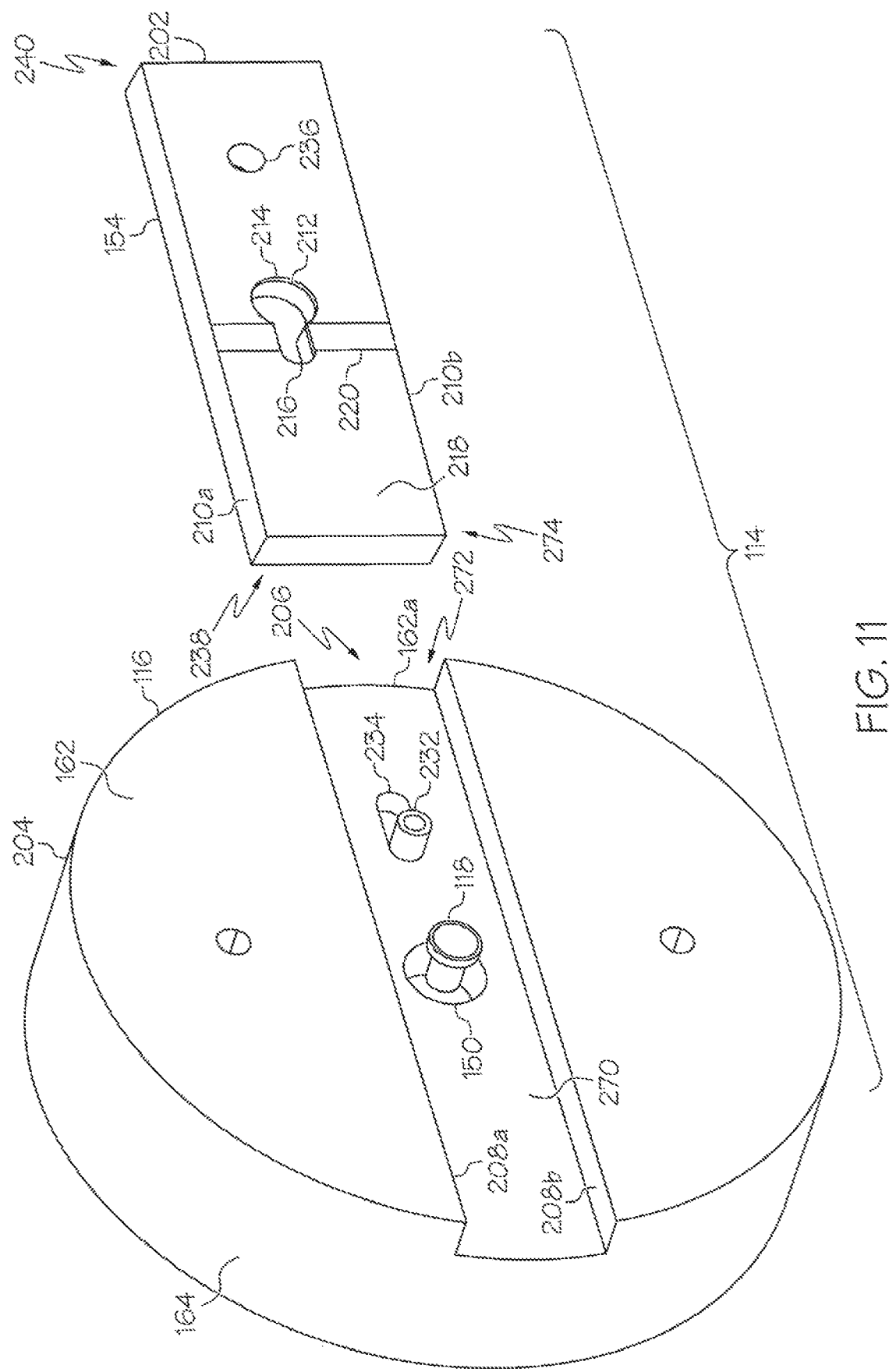
FIG. 11 is a partially exploded schematic perspective view of one embodiment of the index pin locking apparatus.

Referring to FIGS. 8-10, and with reference to FIGS. 4 and 5 and FIGS. 6 and 7, the index head 116 may include housing 204. The housing 204 may include a first sidewall 160 (FIG. 8), a second sidewall 162 (FIG. 9) opposite the first sidewall 160 and a peripheral wall 164. The first opening 148 (FIG. 8) may be disposed through the first sidewall 160. The second opening 150 (FIG. 11) may be disposed through the second sidewall 162. The bore 152 may extend from the first sidewall 160 to the second sidewall 162. As one example, and as best illustrated in FIG. 11, the second opening 150 may be disposed through a recessed portion of the second sidewall 162a and the bore 152 may extend to the recessed portion of the second sidewall 162a. The housing 204 may include a peripheral wall 164. As one non-limiting example, and as illustrated, the housing 204 may include a generally circular shape. As other non-limiting examples, housing 204 may include a rectangular shape, a hexagonal shape or any other suitable shape.

Referring to FIGS. 4 and 5, and with reference to FIG. 8, the first sidewall 160 of the index head 116 may be placed in surface contact with the first surface 122 of the structure 102. At least a portion of the first sidewall 160 of the index head 116 may define a contact surface 176. The contact surface 176 may be complimentary to the first surface 122 of the structure 102. For example, contact surface 176 may be complimentary to at least a portion of the first surface 122 around the index location 112. As one example, the contact surface 176 may be substantially flat (e.g., planar) to make flush surface contact with a substantially flat first surface 122 of the structure 102. As another example, the contact surface 176 may not be planar. For example, the contact surface 176 may match the first surface 122 of the structure 102. For instance, the contact surface 176 may be complimentary to a compound contoured surface of the wing of the aircraft.

Referring to FIGS. 6 and 7, the head 156 of the index pin 118 may include a cylindrical portion 178, a frustoconical portion 180 and a spherical portion 182. The cylindrical portion 178 may define a cylindrical surface of the head 156. The frustoconical portion 180 may define a frustoconical surface of the head 156. The frustoconical portion 180 may be directed radially inward from the cylindrical portion 178 to the spherical portion 182. The spherical portion 182 may define a spherical surface (e.g., a full sphere) or semi-spherical surface (e.g., a partial sphere) of the head 156. The head 156 may also include a relief 192 (FIG. 7) formed between the frustoconical portion 180 and the spherical portion 182. The relief 192 may define another cylindrical surface of the head 156. The cylindrical portion 178 and the frustoconical portion 180 may form (e.g., define) the neck 184. The spherical portion 182 may form the lead-in 166.

As one example, the geometry of the non-binding index pin 118 may include the interlock 168, followed by the lead-in 166, followed by the neck 184. As one example, the geometry of the non-binding index pin 118 may include a stud portion 200 of the interlock 168, followed by a standoff portion 198 of the interlock 168, followed by the spherical portion 182 of the lead-in 166, followed by the relief 192, followed by the frustoconical portion 180 of the neck 184, followed by the cylindrical portion 178 of the neck 184. The frustoconical portion 180 may define a transition surface leading to the cylindrical portion 178.

The lead-in 166 may include any shape such that a cross section of the lead-in 166 (e.g., at any point along the longitudinal pin axis A2) at any angle (e.g., relative to the longitudinal pin axis A2) can be superscribed by a circle of the same diameter, for example, of the diameter of the first opening 148 through which the lead-in 166 passes. As one example, the lead-in 166 may be parabolic. The lead-in 166 may be concentric with the pin axis A2. A major diameter (e.g., the largest diameter at any point along the longitudinal pin axis A2) of the lead-in 166 may be slightly smaller than diameter of the bore 152 it must pass through.

The relief may be smaller than the major diameter of the index pin 118. This allows the index pin 118 to pivot off the center bore axis A1 (FIG. 4) of the bore 152 it must pass through.

The transition surface, for example, formed by the frustoconical portion 180, of the neck 184 may provide a ramp for a corner of the bore 152 (e.g., a perimeter edge of the first opening 148) to ride against as the index pin 118 is inserted into the bore 152 through the first opening 148. As the index pin 118 is moved farther into the bore 152, the lead-in 166 stays on the axis A1 of the bore 152 and the index head 116 may at least partially rotate, for example, in the direction of arrow 190 (FIG. 3) to position the bore 152 into substantial alignment with the index pin 118. The transition surface formed by the frustoconical portion 180 of the neck 184 may be any shape that allows a smooth transition from the relief 192 to the cylindrical portion 178.

The neck 184 (e.g., the cylindrical portion 178) and the lead-in 166 (e.g., the spherical portion 182) may be substantially concentric. As the transition surface formed by the frustoconical portion 180 of the neck 184 passes into the bore 152, the lead-in 166 and neck 184 will be the only features in contact with the bore 152 and these two features will be substantially concentric with the bore 152. This geometric configuration precludes the possibility of binding, allowing the index pin 118 and the bore 152 to self align even with very little clearance (e.g., even less than 0.0002"). The diameter of the neck 184 (e.g., the cylindrical portion 178) and the major diameter of the lead-in 166 (e.g., the spherical portion 182) are substantially identical.

The cylindrical portion 178 may include an external diameter in close tolerance with (e.g., slightly smaller than) the internal diameter of the bore 152. In one example construction, the spherical portion 182 may include an external diameter equal to the external diameter of the cylindrical portion 178 and, thus, in close tolerance with the internal diameter of the bore 152. In another example construction, the spherical portion 182 may include an external diameter smaller than the external diameter of the cylindrical portion 178 and, thus, smaller than the internal diameter of the bore 152. The relief 192 may include an external diameter smaller than the external diameter of the spherical portion 182 and the cylindrical portion 178.

Figure 14:
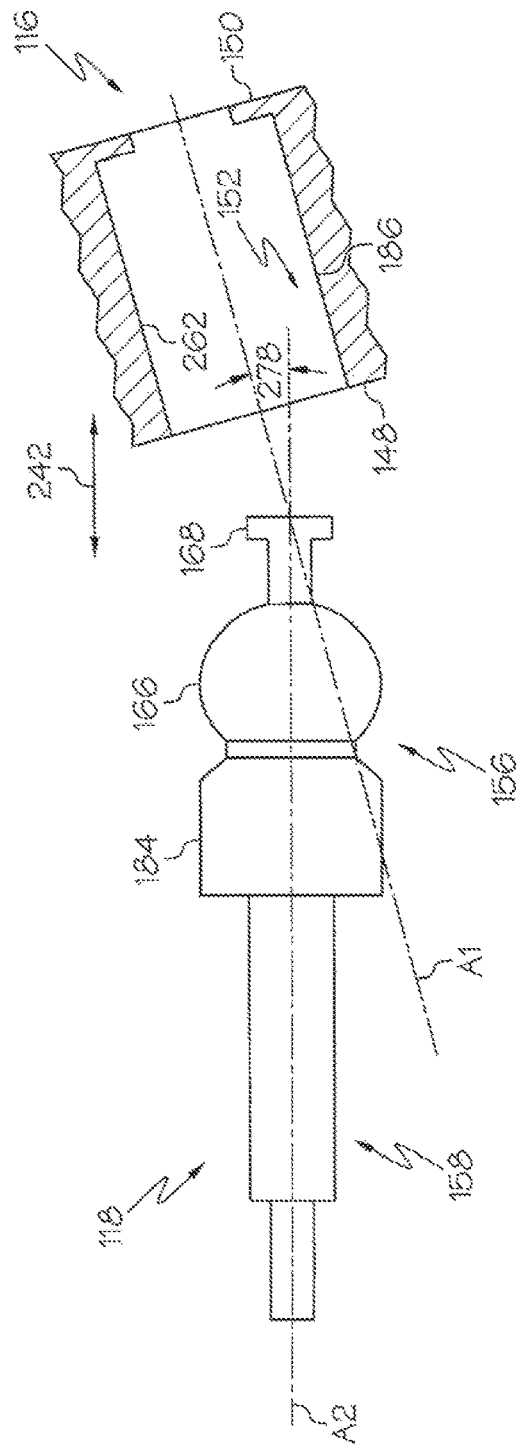
FIG. 14 is a schematic partial side elevational illustration of one embodiment of an index head and the index pin of the index pin locking apparatus.
Figure 15:
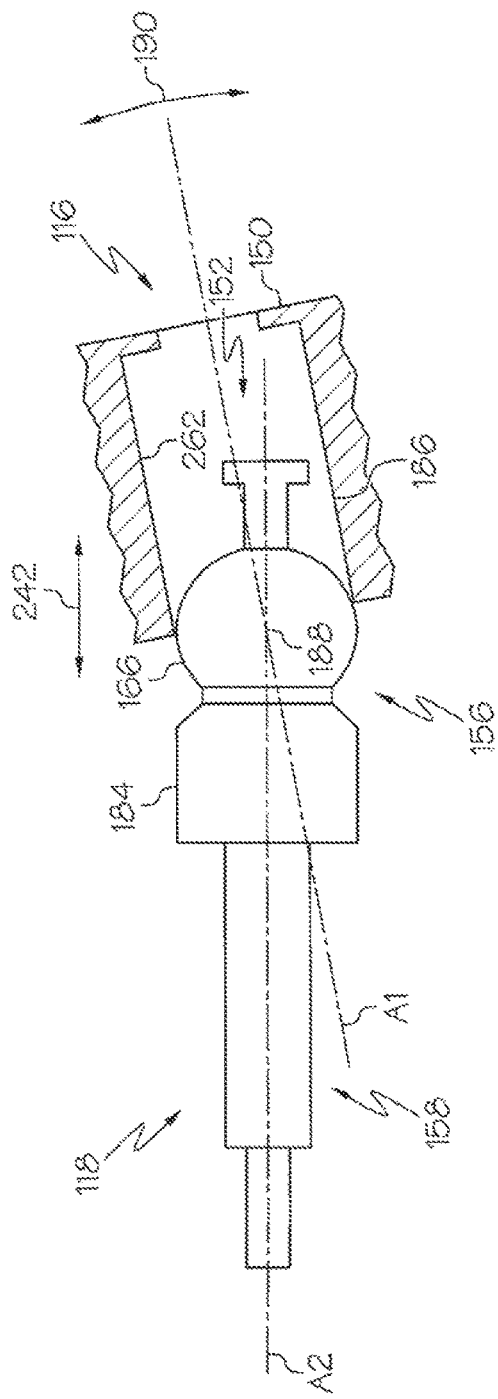
FIG. 15 is a schematic partial side elevational illustration of one implementation of the index head being coupled to the index pin of FIG. 14.
Figure 16:
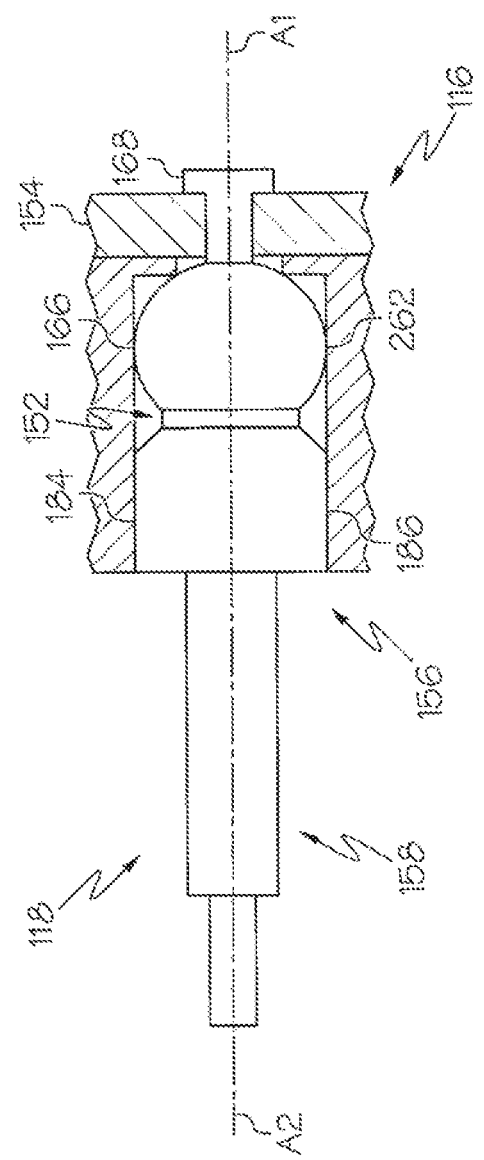
FIG. 16 is a schematic partial side elevational illustration of one implementation of the index head coupled to the index pin of FIG. 14.

Referring to FIGS. 14-16, and with reference to FIGS. 3-5 and FIGS. 6 and 7, the lead-in 166 of the head 156 of the index pin 118 may allow for self-aligning and non-binding insertion of the head 156 of the index pin 118 into the bore 152. The index head 116 may include a cylindrical sidewall 186 formed therewithin and extending between the first opening 148 and the second opening 150 defining the bore 152. FIGS. 14-16 depict a partial cut-away view of the index head 116 to illustrate the interface between the index pin 118 and the sidewall 186. The spherical portion 182 (FIGS. 6 and 7) defining the lead-in 166 may allow for insertion of the head 156 of the index pin 118 through the first opening 148 and into the bore 152 of the index head 116 regardless of the orientation of the index head 116 relative to the index pin 118. For example, initial insertion of the lead-in 166 may be easily accomplished since it is easy to insert the spherical portion 182 defining the lead-in 166 into the correspondingly shaped bore 152 through the correspondingly shaped first opening 148, even when the pin axis A2 is not substantially aligned with the bore axis A1, for example, when the pin axis A2 intersects the bore axis A1 at a non-zero angle 278, as illustrated in FIG. 14.

As illustrated in FIG. 15, upon initial insertion of the head 156 into the bore 152, through the first opening 148, a portion of the spherical surface of the lead-in 166 (e.g., of the spherical portion 182) may contact and cooperate with a portion of an interior surface 262 of the sidewall 186 forming the bore 152. The interaction between the lead-in 166 and the interior surface 262 of the sidewall 186 defining the bore 152 may allow some rotational motion, for example, in the direction of arrow 190, of the index head 116 relative to the index pin 118, for example, about the intersection 188 of the pin axis A2 and the bore axis A1. As illustrated in FIG. 16, as the head 156 of the index pin 118 is further received within the bore 152, the frustoconical portion 180 and the relief 192 (FIG. 7), defining the neck 184, may guide the head 156 into the first opening 148 and through the bore 152 to coaxially align the pin axis A2 and the bore axis A1.

Referring to FIG. 3, and with reference to FIG. 2, FIGS. 4 and 5, and FIGS. 14-16, the coupling 138 connecting the index head 116 to the base 130 (FIG. 2), for example, connecting the index head 116 to the arm 132, may allow for the motion of the index head 116, for example, relative to the arm 132 and/or the index pin 118. As one example, the coupling 138 may be configured to allow for some relative rotational movement of the index head 116, for example, in the direction of arrow 190 (FIG. 3) (e.g., about the Y-axis). The coupling 138 may be configured to also allow for some relative rotational movement of the index head 116 in other directions (e.g., about the X-axis and/or the Z-axis). As another example, the coupling 138 may be configured to allow for some relative linear (e.g., side-to-side) motion of the index head 116, for example, in the direction of arrow 194 (FIG. 3) (e.g., along the Y-axis). Such relative movement (e.g., rotational and/or linear) of the index head 116 may coaxially align the bore 152 and the index pin 116 as the head 156 of the index pin 118 is inserted through the first opening 148 and received within the bore 152, as illustrated in FIGS. 14-16, and the index head 116 is positioned in surface contact with the first surface 122 of the structure 102, as illustrated in FIGS. 4 and 5, for example, as the index head 116 is moved in the direction of arrow 124 (FIG. 3) toward the structure 102.

Referring to FIG. 3, in one example construction, the coupling 138 may include self-alignment assembly 264. The self-alignment assembly 264 allow for rotational and/or linear movement of the index head 116 relative to the coupling 138. For example, the self-alignment assembly 264 of the coupling 138 may provide at least partial free rotational and/or linear movement of the index head 116 relative to the coupling 138 as the index pin 118 is captured within the bore 152 (FIG. 4). As one non-limiting example, the self-alignment assembly 264 of the coupling 138 may include internal bearings and cooperating inner and outer races (not explicitly identified in FIG. 3). As another non-limiting example, the self-alignment assembly 264 of the coupling 138 may include three self-aligning mounted bearings (not explicitly illustrated). As one example, the self-alignment assembly 264 of the coupling 264 may allow for at least partial rotation about the Y-axis (e.g., pitch), for example, in the direction of arrow 190. As another example, the self-alignment assembly 264 of the coupling 264 may allow for at least partial rotation about the X-axis (e.g., roll), for example, in the direction of arrow 266. As another example, the self-alignment assembly 264 of the coupling 264 may allow for at least partial rotation about the Z-axis (e.g., yaw), for example, in the direction of arrow 268. As yet another example, the self-alignment assembly 264 of the coupling 264 may allow for linear motion along the Y-axis, for example, in the direction of arrow 194. Thus, one or more of roll, pitch and/or yaw are all possible with this configuration, for example, to align the bore 152 (FIG. 4) of the index head 116 with the index pin 118 as the rounded portion of the index pin 118 proximate the second end 142 (e.g., the lead-in 166) is received within the bore 152 of the index head 116.

Referring to FIG. 16, and with reference to FIGS. 4 and 5, once the neck 184 and the lead-in 166 of the head 156 of the index pin 118 are captured by and completely received within the bore 152, the interlock 168 may extend through the second opening 150. When the interlock 168 is extended through the second opening 150, the interlock 168 may be operatively engaged by the pin lock 154 of the index head 116 to retain the index pin 118 within the bore 152 and couple the index head 116 to the structure 102 (FIG. 5). With the interlock 168 operatively engaged by the pin lock 154, the index pin 118 cannot linearly move or be removed from within the bore 152.

Referring to FIGS. 9 and 10, and with reference to the FIGS. 6 and 7, the pin lock 154 may be movable relative to the bore 152 and, thus, relative to the index pin 118 to engage the head 156 of the index pin 118, when the index pin 118 is received within the bore 152. For example, the pin lock 154 may be movable relative to the second opening 150 of the index head 116 and, thus, relative to the interlock 168 of the head 156 of the index pin 118, to engage the head 156 (e.g., the interlock 168) of the index pin 118, when the head 156 is completely received within the bore 152 (FIGS. 4 and 5). As one example, the pin lock 154 may move between a first (e.g., disengaged or unlocked) position, as illustrated in FIG. 9, and a second (e.g., engaged or locked) position, as illustrated in FIG. 10. As one example, the pin lock 154 may move linearly, for example, in the direction of arrow 196, along the second sidewall 162 of the index head 116. As another example, the pin lock 154 may move rotatably (not explicitly illustrated).

Referring to FIGS. 6 and 7, the interlock 168 may be coupled to (e.g., extend outwardly from) the lead-in 166 along the pin axis A2. In one example construction, the interlock 168 of the head 156 of the index pin 118 may include a standoff portion 198 and a stud portion 200. The standoff portion 198 may be coupled to (e.g., extend from) the spherical portion 182. The standoff portion 198 may define a cylindrical surface of the interlock 168. The stud portion 200 may be coupled to (e.g., disposed at) an end of the standoff portion 198 opposite the spherical portion 182. The stud portion 200 may include an external diameter less than the external diameter of the spherical portion 182. The standoff portion 198 may include an external diameter less than the external diameter of the stud portion 200. The external diameter of the stud portion 200 may be smaller than the internal diameter of the second opening 150 of the index head 116 to allow the stud portion 200 and at least a part of the standoff portion 198 to extend through the second opening 150 when the head 156 of the index pin 118 is completely received within the bore 152 (FIGS. 4 and 5).

Referring to FIGS. 9-11, and with reference to FIGS. 6 and 7, the pin lock 154 may be configured to operatively engage the standoff portion 198 and the stud portion 200 of the interlock 168 of the head 156 of the index pin 118 when in the second position, as illustrated in FIG. 10, and disengage the standoff portion 198 and the stud portion 200 when in the first position, as illustrated in FIG. 9.

In one example construction, the pin lock 154 may include a slide 202. The slide 202 may be movably connected to the housing 204 of the index head 116. As one example, the index head 116 may include a groove 206 disposed in the second sidewall 162 of the housing 204. The groove 206 may include an inwardly formed channel or recess 270 (FIG. 11).

As best illustrated in FIG. 11, the groove 206 may intersect or cross over the second opening 150 in the second sidewall 162 such that the slide 202 at least partially covers the second opening 150. The groove 206 may be configured to capture the slide 202 and limit movement to a single direction, for example, linearly in the direction indicated by arrow 196 (FIGS. 9 and 10).

Referring to FIG. 11, as one example, the groove 206 may form a female portion 272 of a tapered sliding dovetail joint and the slide 202 may form a male portion 274 of the tapered sliding dovetail joint. For instance, the groove 206 may be formed by a first tapered wall 208*a*, a second tapered wall 208*b* opposite the first tapered wall 208*a* and the recessed portion of the second sidewall 162*a*. The slide 202 may include a first tapered edge 210*a* complementary to the first tapered wall 208*a* and a second tapered edge 210*b* opposite the first tapered edge 210*a* and complimentary to the second tapered wall 208*b*.

Other structural configurations of the pin lock 154 are also contemplated. As one example, the slide 202 may be captivity coupled between an opposed pair of rails coupled to the second sidewall 162 of the housing 204 of the index head 116. As another example, the slide 202 may be movably fastened to the second sidewall 162 of the housing 204.

Referring to FIG. 11, and with reference to FIGS. 6 and 7 and FIGS. 9 and 10, in one embodiment, the slide 202 may include an aperture 212. The aperture 212 may be at least partially aligned with second opening 150 of the index head 116. The aperture 212 may releasably engage the interlock 168 when the slide 202 is moved from the first position (FIG. 9) to the second position (FIG. 10).

As one example, the aperture 212 may be a keyhole aperture. For example, the aperture 212 may include an enlarged portion 214 and a narrowed portion 216. The enlarged portion 214 of the aperture 212 may include an internal diameter larger than the external diameter of the stud portion 200 of the interlock 168. The internal diameter of the enlarged portion 214 may be smaller than the internal diameter of second opening 150 and, thus, smaller than the external diameter of the lead-in 166 (or the spherical portion 182) to prevent the head 156 of the index pin 118 from completely exiting the bore 152 through the second opening 150. The narrowed portion 216 may include an internal diameter larger than the external diameter of the standoff portion 198 of the interlock and smaller than the external diameter of the stud portion 200. The standoff portion 198 may include a length greater than the thickness of the slide 202. The stud portion 200 extends through the aperture 212 when the head 156 of the index pin 118 is completely received within the bore 152 (FIG. 5).

Prior to coupling the index head 116 to the index pin 118, the slide 202 may be in the first position (FIG. 9). With the slide in the first position, a center of the enlarged portion 214 may be coaxially aligned with the second opening 150 and the index pin 118. During the coupling of the index head 116 to the index pin 118, the head 156 of the index pin 118 may be completely received within the bore 152 (FIG. 5). With the head 156 completely received within the bore 152, the stud portion 200 may be extended through the second opening 150 and through the enlarged portion 214 of the aperture 212. Moving the slide 202 to the second position (FIG. 10) may coaxially align the narrowed portion 216 with the second opening 150 and the index pin 118 such that the standoff portion 198 may be extended through the narrowed portion 216 and the stud portion 200 may be engaged with a side surface 218 of the slide 202 to lock the index pin 118 within the bore 152 of the index head 116. Movement of the slide 202 between the first position and the second position may be automatically controlled.

The slide 202 may include a ramp 220 formed on the side surface 218 about the aperture 212. For example, the ramp 220 may begin at an intersection of the narrowed portion 216 and the enlarged portion 214 of the aperture 212 and extend upwardly toward an end of the narrowed portion 216. As the slide 202 is being moved from the first position to the second position, the stud portion 200 of the interlock 168 may engage the ramp 220 and the ramp 220 may urge (e.g., pull) the index pin 118 further within the bore 152 (e.g., outward through the second opening 150).

In another embodiment (not explicitly illustrated), the slide 202 may include a first end 238 and a second end 240 opposite the first end 238 (FIG. 11). The first end 238 may be positioned adjacent to the second opening 150 in the second sidewall 162 of the index head 116 and the portion of the head 156 of the index pin 118 extending through the second opening 150 (e.g., the interlock 168) when in the first position. The aperture 212 (e.g., a slot) may extend inwardly from the first end 238. The aperture 212 may include an internal diameter larger than the external diameter of the standoff portion 198 of the interlock and smaller than the external diameter of the stud portion 200. When the slide 202 is moved within the groove 206 to the second position, the aperture 212 may receive the standoff portion 198 of the interlock 168 extending through the second opening 150 and the stud portion 200 may engage the side surface 218 of the slide 202. Movement of the slide 202 between the first position and the second position may be automatically controlled.

While the example embodiments of the index head 116 of FIGS. 4, 5 and 9-11 illustrate the pin lock 154 being moveably coupled to an exterior of the housing 204, for example, the slide 202 being slidingly received within the groove 206, other configurations of the pin lock 154 are also contemplated. As one example, the pin lock 154 (e.g., the slide 202) may be movably coupled to an interior of the housing 204 of the index head 116.

In any example embodiment of the index head 116, once the index pin 118 is received within the bore 152, movement of the pin lock 154 to the first position may disengage a portion of the index pin 118 to release the index pin 118. For example, movement of the pin lock 154 to the first position may disengage a portion of the head 156 (e.g., the interlock 168) to release the index pin 118. Similarly, in any example embodiment of the index head 116, once the index pin 118 is received within the bore 152, movement of the pin lock 154 to the second position may engage a portion of the index pin 118 to retain the index pin 118. For example, movement of the pin lock 154 to the second position may engage a portion of the head 156 (e.g., the interlock 168) to retain index pin 118. Movement of the pin lock 154 between the first position and the second position may be automatically controlled.

Figure 12:
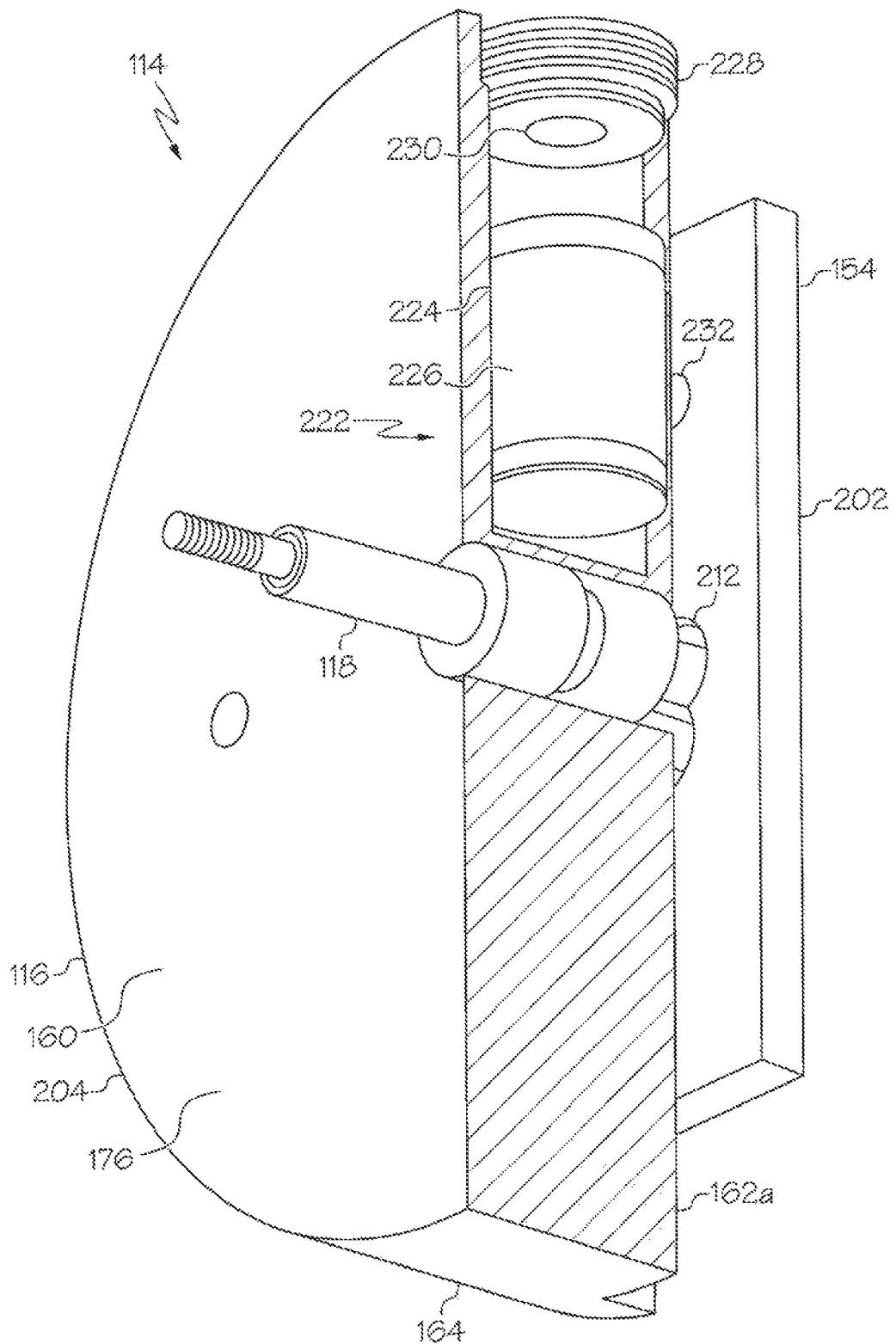
FIG. 12 is a schematic perspective view, in section, of one embodiment of the index pin locking apparatus illustrating the pin lock in the first position.
Figure 13:
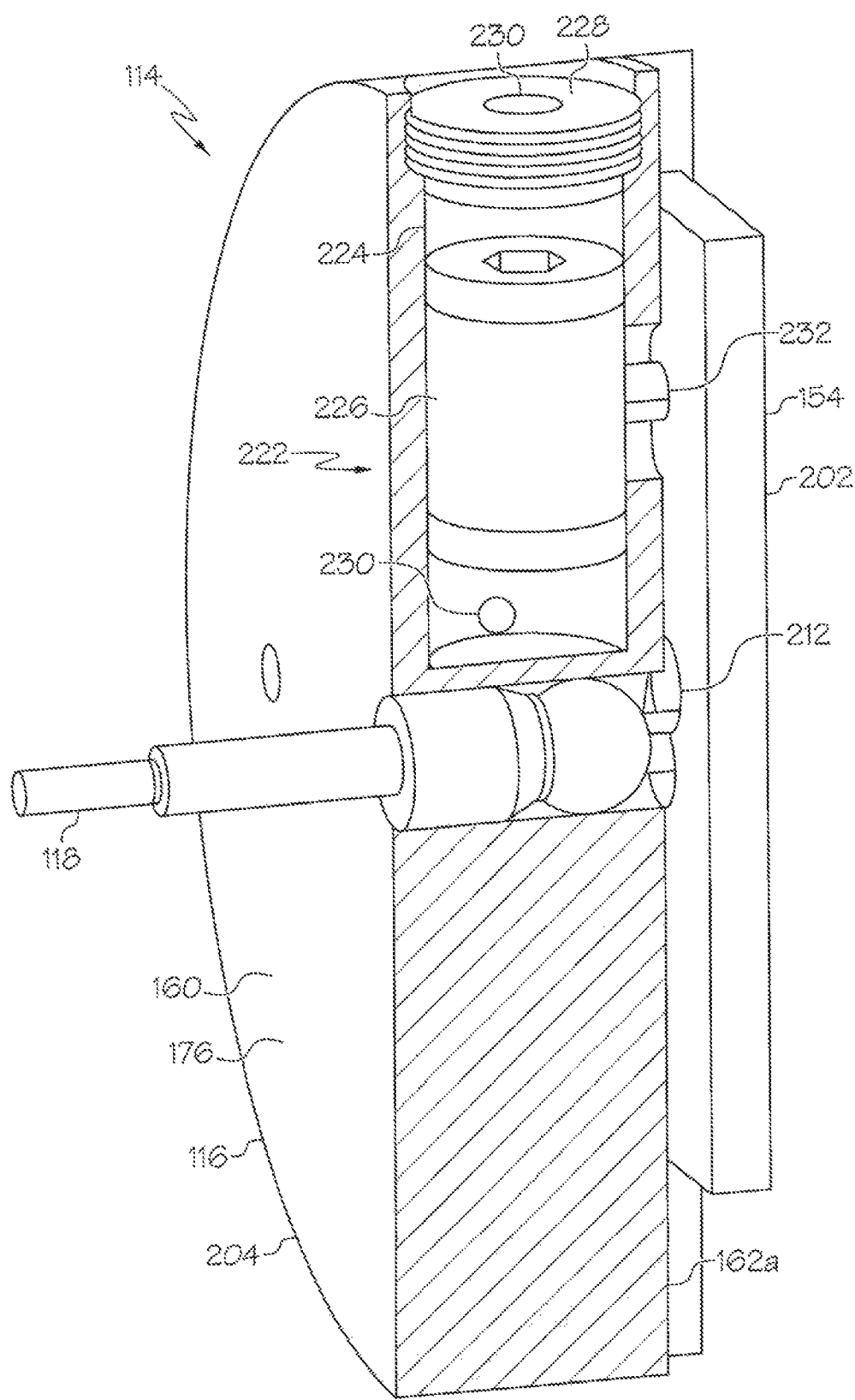
FIG. 13 is a schematic perspective view, in section, of the index pin locking apparatus of FIG. 12 illustrating the pin lock in the second position.

Referring to FIGS. 12 and 13, the index head 116 may include an actuator 222. The actuator 222 may be configured to actuate the pin lock 154 between disengagement and engagement with the index pin 118 (e.g., between the first position and the second position). The actuator 222 may be operatively coupled to the pin lock 154. For example, the actuator 222 may be mechanically connected to the slide 202. The actuator 222 may linearly move the slide 202 (e.g., the pin lock 154) between the first position to disengage the interlock 168 of the head 156 of the index pin 118, as illustrated in FIG. 12, and the second position to engage the interlock 168 of the head 156 of the index pin 118, as illustrated in FIG. 13.

As one example, and as illustrated in FIGS. 12 and 13, the actuator 222 may be a pneumatic actuator (not explicitly identified). As one example, the actuator 222 may include a double action air cylinder. The housing 204 of the index head 116 may include an internal cylindrical barrel 224 and a piston 226 disposed within the barrel 224. The housing 204 may include a pair of ports 230 (FIG. 13) (e.g., an air inlet port and an air outlet port) in fluid communication with the barrel 224 to pressurize the barrel 224 and drive the stroke of the piston 226. The housing 204 may include an end cap 228 to enclose (e.g., seal) the barrel 224. As another example, the actuator 222 may include a single action air cylinder with a spring return (not illustrated).

In such an example, the index head 116 may be fluidly coupled to a source of compressed air (not illustrated) to drive the actuator 222. A control unit 276 (FIGS. 1 and 2) may be communicatively coupled to the source of compressed air to control the actuator 222. Other pneumatic components including, but not limited to, pneumatic lines, valves, couplings and the like may also be used. As one example, the index head 116 and the base 130 of the retention apparatus 110 (FIG. 2) may share a common source of compressed air and control unit.

Referring to FIG. 11, and with reference to FIGS. 12 and 13, the actuator 222 may include a rod 232. The rod 232 may be rigidly coupled to the piston 226. The rod 232 may extend through a slot 234 formed through the second sidewall 162 of the housing 204 of the index head 116. The slot 234 may be positioned within the groove 206 formed in the second sidewall 162. The slot 234 may include a length sufficient to allow the full stroke of the piston 226.

Referring to FIGS. 9-11, the rod 232 may be coupled to the slide 202 (e.g., the pin lock 154). As one example, the slide 202 may include a rod aperture 236. The rod aperture 236 may be configured to receive at least a portion of the rod 232 extending from the second sidewall 162 of the housing 204 through the slot 234.

As another example, the actuator 222 may be a hydraulic actuator (not explicitly identified). As one example, the actuator 222 may include a double action hydraulic cylinder. The housing 204 of the index head 116 may include the internal cylindrical barrel 224, the piston 226 disposed within the barrel 224, the pair of ports 230 in fluid communication with the barrel 224 to pressurize the barrel 224 and drive the stroke of the piston 226 and the end cap 228 to enclose the barrel 224.

In such an example, the index head 116 may be fluidly coupled to a source of pressurized hydraulic fluid (not illustrated) to drive the actuator 222. The control unit 276 may be communicatively coupled to the source of pressurized hydraulic fluid to control the actuator 222. Other hydraulic components including, but not limited to, hydraulic lines, valves, couplings and the like may also be used. As one example, the index head 116 and the base 130 of the retention apparatus 110 (FIG. 2) may share a common source of pressurized hydraulic fluid and control unit.

As another example, the actuator 222 may be a mechanical or electro-mechanical actuator (not explicitly illustrated). As one example, the actuator 222 may be an electric motor coupled to the pin lock 154 (e.g., the slide 202) to move the pin lock 154 between the first position to disengage the index pin 118 and the second position to engage the index pin 118.

Referring to FIGS. 1 and 2, and with reference to FIGS. 3-5, the control unit 276 may be operatively coupled to each retention apparatus 110 (FIG. 2) of the retention system 106 (FIG. 1). The control unit 276 may automatically control movement of the retention apparatus 110, for example, to position the index pin locking apparatus 114 (FIG. 2) relative to the structure 102 (FIG. 1). As one example, and as best illustrated in FIG. 2, the control unit 276 may be operatively coupled to the drive mechanisms 258 of the base 130 (e.g., the drive mechanisms 250 of the stanchion 134, the drive mechanisms 256 of the index table 136 and/or the actuator 248 of the arm 132) to automatically move the index head 116 of the index pin locking apparatus 114 along at least one of the X-axis (e.g., in the direction of arrow 124), the Y-axis (e.g., in the direction of arrow 126) and/or the Z-axis (e.g., in the direction of arrow 128).

Referring to FIGS. 3-5, and with reference to FIGS. 14-16, automatic movement of the index head 116 relative to the index location 112 (e.g., the index pin 118 and/or the structure 102) may automatically capture the index pin 118 within the bore 152 (FIGS. 4 and 5). As one example, the base 130 may position the index head 116 proximate (e.g., at or near) the second end 142 (e.g., the head 156) of the index pin 118 such that the bore axis A1 and the pin axis A2 are substantially aligned, as illustrated in FIG. 4, or intersect, as illustrated in FIG. 14. Once the index head 116 is proximate the index pin 118, the arm 132 may move in the direction of arrow 124 (FIG. 3) to linearly move the index head 116 in the direction of arrow 242 (FIGS. 4 and 15) such that the index pin 118 is received within the bore 152. As described herein above, and illustrated in FIGS. 3, 15 and 16, as the index pin 118 enters the bore 152, the index head 116 may rotationally move in one of the direction of arrow 190, the direction of arrow 266 and/or the direction of arrow 268 and/or linearly move in the direction of arrow 194 to self-align the bore 152 with the index pin 118 (e.g., align the bore axis A1 and the pin axis A2).

Referring to FIGS. 2, 5 and 16, and with reference to FIGS. 12 and 13, the control unit 276 may be operatively coupled to the index head 116 to automatically control the pin lock 154, for example, once the index pin 118 is completely received within the bore 152, to couple the index head 116 and the index pin 118 together. As one example, the control unit 276 may be operatively coupled to the actuator 222 (FIGS. 12 and 13) to automatically move the slide 202 (FIGS. 12 and 13) between the first position (e.g., disengaging and releasing the index pin 118), as illustrated in FIG. 12, and the second position (e.g., engaging and retaining the index pin 118), as illustrated in FIG. 13.

Once the pin lock 154 (e.g., the slide 202) is moved into engagement with the index pin 118 (e.g., moved into the second position), the index head 116 may retain (e.g., hold) the index pin 118 and, thus, be coupled to and support the structure 102 until the index pin 118 is actively released by the index head 116. Thus, the disclosed index pin locking apparatus 114 may act as a fail safe. For example, in response to loss of power or source pressure to the actuator 222 of the index head 116, the index head 116 may remain engaged to the index pin 118 and coupled to and support the structure 102. Once the pin lock 154 is moved into disengagement with the index pin 118 (e.g., moved into the first position), the index head 116 may release the index pin 118 and the index head 116 may be moved away from the structure 102, for example, in order to perform one or more processing operations on the structure 102 near the index location 112 (FIG. 3). Following the desired processing operation, the index head 116 may be moved back to receive and engage the index pin 118 and be coupled to and support the structure 102, as described above.

Figure 17:
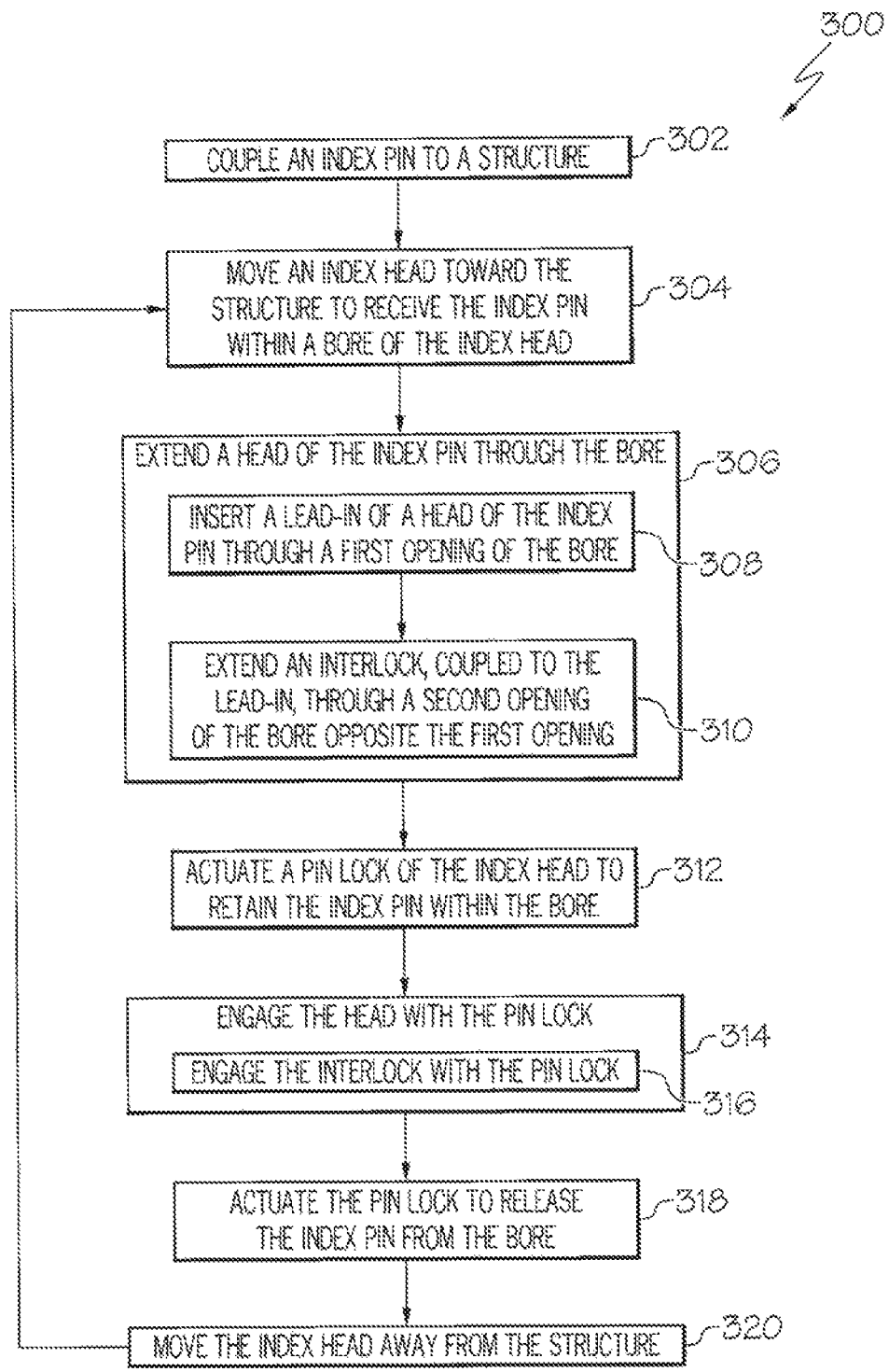
FIG. 17 is a flow diagram of one embodiment of a method for supporting a structure in a predetermined position.

Referring to FIG. 17, and with reference to FIGS. 1-16, one embodiment of a method, generally designated 300, for supporting the structure 102 in a predetermined position is disclosed. The method 300 may be performed prior to, during or after a manufacturing operation performed on the structure 102.

The method 300 may include the step of coupling the index pin 118 to the structure 102, as shown at block 302. For example, the shank 158 of the index pin 118 may be received through the index opening 120 in the structure 102. The index pin 118 may be fastened (e.g., by the fastener 144) to the structure 102. In one example implementation, a plurality of index pins 118 may be coupled to the structure 102 at a plurality of index locations 112, as illustrated in FIG. 1.

The index head 116 of each retention apparatus 110, for example, of a plurality of retention apparatus 110 of the retention system 106, may be releasably coupled to each index pin 118 of the plurality of index pins 118 coupled to the structure 102. Once the index head 116 is coupled to the index pin 118, the base 130 of the retention apparatus 110 may support the structure 102 at the predetermined position.

The method 300 may include the step of moving the index head 116 toward the structure 102 to receive the index pin within the bore 152 of the index head 116, as shown at block 304. For example, the base 130 of the retention apparatus 110 may move the index head 116, for example, linearly, to position the first opening 148 of the index head 116 proximate to and generally aligned with the head 156 of the index pin 118. As one example, movement of the index head 116 may be performed automatically, for example, in response to a positioning signal generated by the control unit 276.

The method 300 may include the step of extending the head 156 of the index pin 118 through the bore 152, as shown at block 306. The step of extending the head 156 of the index pin 118 through the bore 152 (block 306) may include the step of inserting the lead-in 166 of the head 156 of the index pin 118 through the first opening 148 of the bore 152, as shown at block 308. The step of extending the head 156 of the index pin 118 through the bore 152 (block 306) may include the step of extending the interlock 168 of the head 156, coupled to the lead-in 166, through the second opening 150 of the bore 152 opposite the first opening 148, as shown at block 310. For example, the base 130 of the retention apparatus 110 may move the index head 116, for example, linearly, to receive the head 156 of the index pin 118 through the first opening 148 and within the bore 152.

The method 300 may include the step of actuating the pin lock 154 of the index head 116 to retain the index pin 118 within the bore 152, as shown at block 312. As one example, actuation of the pin lock 154 may be performed automatically, for example, in response to a positioning signal generated by the control unit 276.

The method 300 may include the step of engaging the head 156 with the pin lock 154, as shown at block 314. The step of engaging the head 156 with the pin lock 154 (block 314) may include the step of engaging the interlock 168 with the pin lock 154, as shown at block 316.

The method 300 may include the step of actuating the pin lock 154 to release the index pin 118 from the bore 152, as shown at block 318. As one example, actuation of the pin lock 154 may be performed automatically, for example, in response to an actuation signal generated by the control unit 276.

The method 300 may include the step of moving the index head 116 away from the structure 102, as shown at block 320. For example, the index pin 118 may be released from within the bore 152 and the index head 116 may be moved away from the structure 102, for example, by the base 130, in order for the manufacturing operation to be performed on the structure 102 near the index location 112.

The method 300 may continue with the step of moving the index head 116 toward the structure 102 to receive the index pin within the bore 152 of the index head 116 (block 304), for example, when a manufacturing operation performed near the index location 112 has been completed, the retention apparatus 110 may be re-coupled to the structure 102.

Modifications, additions, or omissions may be made to the method 300 without departing from the scope of the present disclosure. The method 300 may include more, fewer, or other steps. Additionally, steps may be performed in any suitable order.

Figure 18:
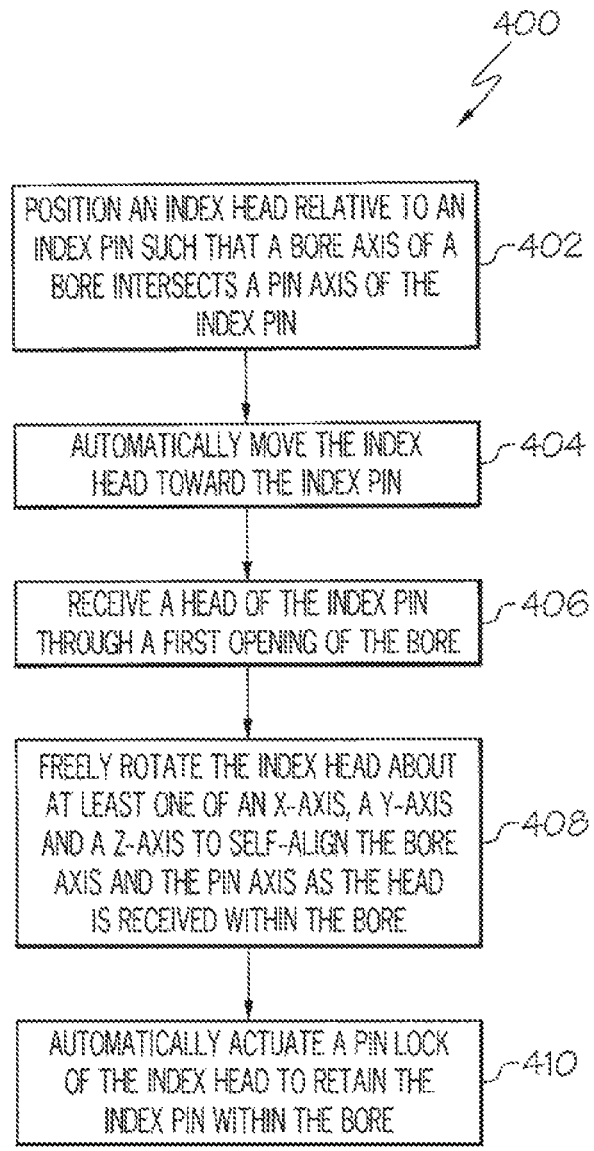
FIG. 18 is a flow diagram of one embodiment of a method for capturing the index pin within a bore of the index head.

Referring to FIG. 18, and with reference to FIGS. 1-16, one embodiment of a method, generally designated 400, for capturing the index pin 118 within the bore 152 of the index head 116 is disclosed. As one example, the method 400 may be performed in conjunction with the method 300 (FIG. 17).

The method 400 may include the step of positioning the index head 116 relative to the index pin 118 such that the bore axis A1 of the bore intersects the pin axis A2 of the index pin 118, as shown at block 402. As one example, the base 130 of the retention apparatus 110 may automatically position the index head 116 relative to the index pin 118.

The method 400 may include the step of automatically moving the index head 116 toward the index pin 118, as shown at block 404. As one example, the base 130 of the retention apparatus 110 may automatically move the index head 116 toward the index pin 118.

The method 400 may include the step of receiving a head 156 of the index pin 118 through a first opening 148 of the bore 152, as shown at block 406. The method 300 may include the step of freely rotating the index head 116 about at least one of the X-axis, the Y-axis and the Z-axis to self-align the bore axis A1 and the pin axis A2 as the head 156 is received within the bore 152, as shown at block 408.

The method 400 may include the step of automatically actuating the pin lock 154 of the index head 116 to retain the index pin 118 within the bore 152, as shown at block 410.

Modifications, additions, or omissions may be made to the method 400 without departing from the scope of the present disclosure. The method 400 may include more, fewer, or other steps. Additionally, steps may be performed in any suitable order.

Figure 19:
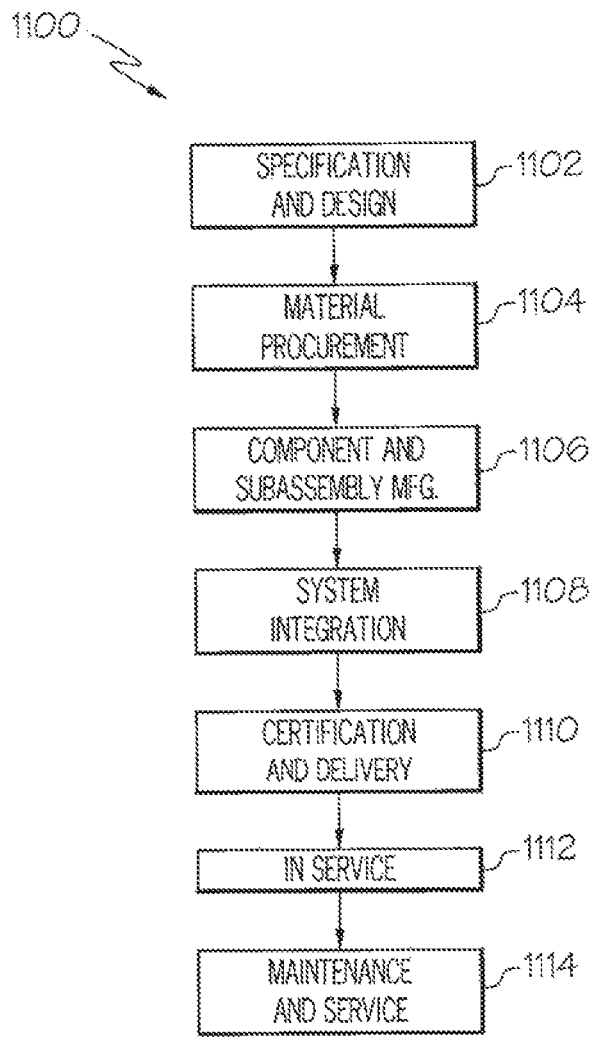
FIG. 19 is a block diagram of an aircraft production and service methodology.
Figure 20:
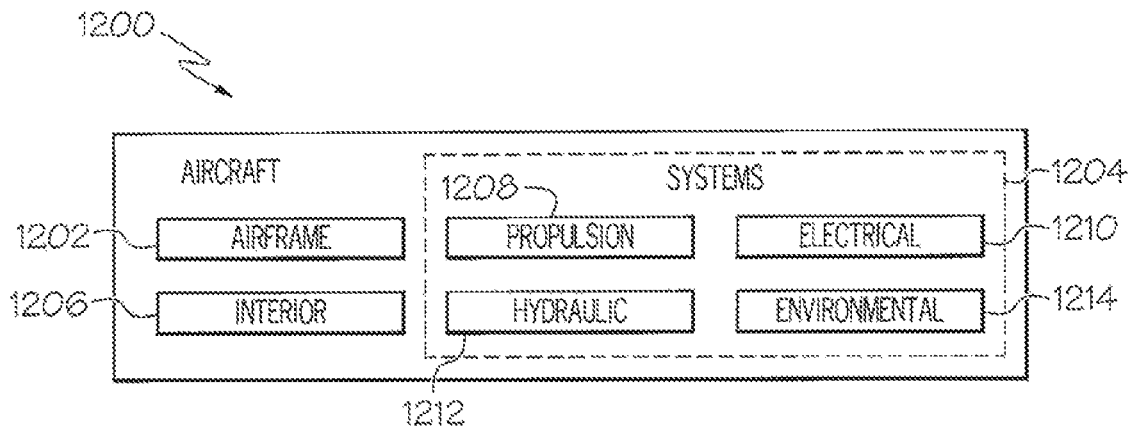
FIG. 20 is a schematic illustration of an aircraft.

Examples of the present disclosure may be described in the context of an aircraft manufacturing and service method 1100 as shown in FIG. 19 and an aircraft 1200 as shown in FIG. 20. During pre-production, the illustrative method 1100 may include specification and design, as shown at block 1102, of the aircraft 1200 and material procurement, as shown at block 1104. During production, component and subassembly manufacturing, as shown at block 1106, and system integration, as shown at block 1108, of the aircraft 1200 may take place. Thereafter, the aircraft 1200 may go through certification and delivery, as shown block 1110, to be placed in service, as shown at block 1112. While in service, the aircraft 1200 may be scheduled for routine maintenance and service, as shown at block 1114. Routine maintenance and service may include modification, reconfiguration, refurbishment, etc. of one or more systems of aircraft 1200.

Each of the processes of illustrative method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 20, the aircraft 1200 produced by the illustrative method 1100 may include an airframe 1202 with a plurality of high-level systems 1204 and an interior 1206. Examples of the high-level systems 1204 may include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive and marine industries.

The apparatus and methods shown or described herein may be employed during any one or more of the stages of the manufacturing and service method 1100. For example, components or subassemblies corresponding to component and subassembly manufacturing (block 1106) may be fabricated or manufactured in a manner similar to components or subassemblies produced while aircraft 1200 is in service (block 1112). Also, one or more examples of the apparatus and methods, or combination thereof may be utilized during production stages (blocks 1108 and 1110), for example, by reducing the costs, times and risk of injury associated with the assembly of components or subassemblies in the aircraft manufacturing and service processes. Similarly, one or more examples of the apparatus and methods, or a combination thereof, may be utilized, for example and without limitation, while aircraft 1200 is in service (block 1112) and during maintenance and service stage (block 1114).

Accordingly, the apparatuses and methods described herein may allow for the automated capturing of an index pin coupled to a structure and the automated coupling and uncoupling of a structure during one or more manufacturing operations performed on the structure.

Although various embodiments of the disclosed apparatuses and methods have been shown and described, modifications may occur to those skilled in the art upon reading the specification. The present application includes such modifications and is limited only by the scope of the claims.

What is claimed is:

1. A method for supporting a structure in a predetermined position, said method comprising:

coupling a shank portion of an index pin to said structure so that a head portion of said index pin, coupled to said shank portion, projects from said structure;
automatically moving an index head toward said structure to position said head portion within a bore of said index head;
moving a pin-lock slide of said index head along a pin-lock guide of said index head, transverse to said bore; and
engaging said pin-lock slide with an interlock portion of said index pin extending from an end of said head portion, opposite said shank portion, to retain said index pin within said bore.

2. The method of claim 1 further comprising:
disengaging said pin-lock slide from said interlock portion to release said index pin from said bore; and
moving said index head away from said structure.

3. The method of claim 1 further comprising:
extending said head portion of said index pin through said bore so that said interlock portion extends beyond said index head.

4. The method of claim 3 wherein:
extending said head portion of said index pin through said bore comprises:
inserting a lead-in portion of said head through a first opening of said bore; and
extending said interlock portion of said head portion, coupled to said lead-in portion, through a second opening of said bore opposite said first opening.

5. The method of claim 1 wherein moving said index head comprises:
positioning said index head along at least one of an X-axis, a Y-axis, and a Z-axis so that a bore axis of said bore intersects a pin axis of said index pin; and
freely pivoting said index head about at least one of said X-axis, said Y-axis, and said Z-axis relative to said index pin to coaxially align said bore axis with said pin axis.

6. The method of claim 1 wherein:
said pin-lock slide comprises an aperture configured to transverse said bore when moving said pin-lock slide; and
moving said pin-lock slide positions said aperture relative to said bore.

7. The method of claim 6 wherein releasably engaging said pin-lock slide with said interlock portion comprises positioning said interlock portion within a pin-locking portion of said aperture.

8. The method of claim 6 further comprising disengaging said pin-lock slide from said interlock portion.

9. The method of claim 8 wherein disengaging said pin-lock slide from said interlock portion comprises positioning said interlock portion within a pin-unlocking portion of said aperture.

10. The method of claim 9 wherein:
said pin-locking portion of said aperture comprises a narrowed portion of said aperture having a first internal dimension that is smaller than a cross sectional dimension of said interlock portion; and
said pin-unlocking portion of said aperture comprises an enlarged portion of said aperture having a second internal dimension that is larger than said cross sectional dimension of said interlock portion.

11. The method of claim 9 wherein:
said interlock portion comprises:
a standoff portion extending coaxially from said end of said head portion; and
a stud portion coupled to an end of said standoff portion and sized larger than said standoff portion;
said pin-unlocking portion of said aperture is sized larger than said standoff portion and said stud portion to permit insertion of said standoff portion and said stud portion within said aperture when said pin-lock slide is moved into a first position, and said pin-locking portion of said aperture is sized smaller than said stud portion to prevent removal of said stud portion from said aperture when said pin-lock slide is moved into a second position.

12. The method of claim 1 further comprising receiving said head portion within said bore so that said interlock portion of said index pin, extending coaxially from said end of said head portion, projects from said bore.

13. The method of claim 1 further comprising:
disengaging said pin-lock slide from said interlock portion; and
withdrawing said head portion from said bore.

14. The method of claim 1 wherein:
said pin-lock slide comprises an aperture configured to transverse said bore when moving said pin-lock slide, said aperture comprising a narrowed pin-locking portion and an enlarged pin-unlocking portion; and
moving said pin-lock slide positions said aperture relative to said bore and said interlock portion.

15. The method of claim 14 wherein moving said pin-lock slide one of positions said interlock portion within said narrowed pin-locking portion or positions said interlock portion within said enlarged pin-unlocking portion.

16. The method of claim 1 wherein:
said pin-lock slide comprises an aperture configured to transverse said bore, and said aperture comprising a narrowed pin-locking portion and an enlarged pin-unlocking portion; and
moving said pin-lock slide along said pin-lock guide comprises moving between a first position, in which said interlock portion is positioned within said enlarged pin-unlocking portion of said aperture to disengage said pin-lock slide from said interlock portion and permit linear movement of said index pin within said bore, and a second position, in which said interlock portion of said index pin is positioned within said narrowed pin-locking portion of said aperture to positively engage said pin-lock slide to said interlock portion and prevent linear movement of said index pin within said bore.

17. A method for supporting a structure in a predetermined position, said method comprising:
coupling a shank portion of an index pin to said structure so that a head portion of said index pin, coupled to said shank portion, projects from said structure;
automatically moving an index head toward said structure to receive said index pin within a bore of said index head;
receiving said head portion within said bore so that an interlock portion of said index pin, extending coaxially from an end of said head portion opposite said shank portion, projects from said bore; and
automatically actuating a pin lock of said index head to retain said index pin within said bore.

18. The method of claim 17 wherein actuating said pin lock comprises:
moving a pin-lock slide of said index head along a pin-lock guide of said index head, transverse to said bore; and releasably engaging said pin-lock slide with said interlock portion to retain said index pin within said bore.

19. The method of claim 18 further comprising:

moving said pin-lock slide of said index head along said pin-lock guide of said index head in an opposing direction; and disengaging said pin-lock slide from said interlock portion to release said index pin from within said bore.

20. The method of claim 18 wherein:

said pin-lock slide comprises an aperture configured to transverse said bore when moving said pin-lock slide; and moving said pin-lock slide positions said aperture relative to said bore.

\* \* \* \* \*